United States Patent
Ingale et al.

(10) Patent No.: US 11,996,546 B2
(45) Date of Patent: May 28, 2024

(54) SECONDARY ZINC-MANGANESE DIOXIDE BATTERIES FOR HIGH POWER APPLICATIONS

(71) Applicant: RESEARCH FOUNDATION OF THE CITY UNIVERSITY OF NEW YORK, New York, NY (US)

(72) Inventors: Nilesh Ingale, New York, NY (US); Tal Sholklapper, New York, NY (US); Sanjoy Banerjee, New York, NY (US); Michael Nyce, New York, NY (US)

(73) Assignee: RESEARCH FOUNDATION OF THE CITY UNIVERSITY OF NEW YORK, New York, NY (US)

( * ) Notice: Subject to any disclaimer, the term of this patent is extended or adjusted under 35 U.S.C. 154(b) by 857 days.

(21) Appl. No.: 16/985,983

(22) Filed: Aug. 5, 2020

(65) Prior Publication Data

US 2020/0388828 A1 Dec. 10, 2020

Related U.S. Application Data

(63) Continuation of application No. 14/441,766, filed as application No. PCT/US2013/069166 on Nov. 8, 2013, now abandoned.

(Continued)

(51) Int. Cl.
*H01M 10/28* (2006.01)
*H01M 4/24* (2006.01)
(Continued)

(52) U.S. Cl.
CPC ............ *H01M 4/29* (2013.01); *H01M 4/24* (2013.01); *H01M 4/244* (2013.01); *H01M 4/30* (2013.01);
(Continued)

(58) Field of Classification Search
CPC ............................................. H01M 10/24-288
See application file for complete search history.

(56) References Cited

U.S. PATENT DOCUMENTS

| | | |
|---|---|---|
| 3,024,297 A | 3/1962 | Urry |
| 3,939,010 A | 2/1976 | Coleman et al. |
| | | (Continued) |

FOREIGN PATENT DOCUMENTS

| | | |
|---|---|---|
| AU | 2013342282 A1 | 5/2015 |
| CN | 101438446 A | 5/2009 |
| | (Continued) | |

OTHER PUBLICATIONS

Provisional application entitled "Secondary Zinc-Manganese Dioxide Batteries for High Power Applications," by Sanjoy Banerjee, filed Nov. 9, 2012 as U.S. Appl. No. 61/724,873.

(Continued)

*Primary Examiner* — James Lee
(74) *Attorney, Agent, or Firm* — Andrew M. Metrailer; Conley Rose, P.C.

(57) ABSTRACT

In an embodiment, a secondary $Zn$—$MnO_2$ battery comprises a battery housing, a $MnO_2$ cathode, a $Zn$ anode, and an electrolyte solution. The $MnO_2$ cathode, the $Zn$ anode, and the electrolyte solution are disposed within the battery housing, and the $MnO_2$ cathode comprises a $MnO_2$ cathode mixture and a current collector. The $MnO_2$ cathode mixture is in electrical contact with at least a portion of an outer surface of the current collector, and the $MnO_2$ cathode has a porosity of from about 5 vol. % to about 90 vol. %, based on the total volume of the $MnO_2$ cathode mixture of the $MnO_2$ cathode.

28 Claims, 10 Drawing Sheets

The half-cell reactions are:

$$Zn_{(s)} + 2OH^-_{(aq)} \rightarrow ZnO_{(s)} + H_2O_{(l)} + 2e^- \quad [E° = -1.28V]$$

First election reaction at the cathode:

$$\left.\begin{array}{l} MnO_2 + H_2O + e^- \rightarrow MnOOH = OH^- \\ 2MnOOH \rightleftharpoons Mn_2O_3 + H_2O \end{array}\right\} 2MnO_{2(s)} + H_2O_{(l)} + 2e^- \rightarrow Mn_2O_{3(s)} + 2OH^-_{(aq)} \quad [E° = +0.15V]$$

The second electron reaction at the cathode:

$$3MnOOH + e^- \rightarrow Mn_3O_4 + OH^- + H_2O \quad [E° = +0.59V]$$

The overall reaction is:

$$2MnO_2 + Zn_{(s)} + H_2O_{(l)} + 2e^- \rightleftharpoons Mn_2O_{3(s)} + ZnO_{(s)} + H_2O \quad [E° = 1.43V]$$

Related U.S. Application Data

(60) Provisional application No. 61/732,926, filed on Dec. 3, 2012, provisional application No. 61/724,873, filed on Nov. 9, 2012.

(51) Int. Cl.

| | | |
|---|---|---|
| *H01M 4/29* | (2006.01) | |
| *H01M 4/30* | (2006.01) | |
| *H01M 4/50* | (2010.01) | |
| *H01M 4/62* | (2006.01) | |
| *H01M 4/66* | (2006.01) | |
| *H01M 4/74* | (2006.01) | |
| *H01M 4/80* | (2006.01) | |
| *H01M 50/417* | (2021.01) | |
| *H01M 50/429* | (2021.01) | |
| *H01M 50/44* | (2021.01) | |
| *H01M 50/463* | (2021.01) | |
| *H01M 50/70* | (2021.01) | |
| *H01M 50/77* | (2021.01) | |
| *H02J 7/00* | (2006.01) | |
| *H01M 4/02* | (2006.01) | |

(52) U.S. Cl.
CPC ............. *H01M 4/50* (2013.01); *H01M 4/622* (2013.01); *H01M 4/625* (2013.01); *H01M 4/661* (2013.01); *H01M 4/74* (2013.01); *H01M 4/80* (2013.01); *H01M 4/806* (2013.01); *H01M 10/28* (2013.01); *H01M 50/417* (2021.01); *H01M 50/429* (2021.01); *H01M 50/4295* (2021.01); *H01M 50/44* (2021.01); *H01M 50/463* (2021.01); *H01M 50/70* (2021.01); *H01M 50/77* (2021.01); *H02J 7/0068* (2013.01); *H01M 2004/021* (2013.01); *H01M 4/62* (2013.01)

(56) References Cited

U.S. PATENT DOCUMENTS

| | | |
|---|---|---|
| 4,096,318 A | 6/1978 | Wurmb et al. |
| 4,358,517 A | 11/1982 | Jones |
| 4,929,520 A | 9/1990 | Kordesch |
| 4,957,827 A | 9/1990 | Kordesch |
| 5,069,988 A | 12/1991 | Tomantschger et al. |
| 5,156,934 A | 10/1992 | Kainthia et al. |
| 5,215,836 A | 6/1993 | Eisenberg |
| 5,281,497 A | 1/1994 | Kordesch et al. |
| 5,453,336 A | 9/1995 | Adler et al. |
| 5,863,676 A | 1/1999 | Charkey et al. |
| 6,187,475 B1 | 2/2001 | Oh et al. |
| 7,718,305 B2 | 5/2010 | Daniel-Ivad |
| 2003/0068549 A1 | 4/2003 | Daniel-Ivad et al. |
| 2004/0166413 A1 | 8/2004 | Clash et al. |
| 2004/0185329 A1 | 9/2004 | Kainthla |
| 2005/0208373 A1 | 9/2005 | Davis |
| 2007/0122704 A1 | 5/2007 | Daniel-Ivad |
| 2010/0055572 A1 | 3/2010 | Park |
| 2011/0183188 A1 | 3/2011 | Ogg |
| 2015/0311503 A1 | 5/2015 | Ingale |

FOREIGN PATENT DOCUMENTS

| | | |
|---|---|---|
| CN | 101677135 A | 3/2010 |
| CN | 104885287 A | 9/2015 |
| DE | 3337568 A1 | 4/1985 |
| JP | 2000067918 A | 3/2000 |
| JP | 2003045506 A | 2/2003 |
| JP | 2007529871 A | 10/2007 |
| JP | 2008071536 A | 3/2008 |
| JP | 2008511961 A | 4/2008 |
| WO | 2005091401 A1 | 9/2005 |
| WO | 2006026232 A1 | 3/2006 |
| WO | 2011047105 A1 | 4/2011 |
| WO | 2014074830 A1 | 5/2014 |

OTHER PUBLICATIONS

Provisional application entitled "Novel, Freestanding Manganese Dioxide Cathodes for Alkaline Batteries," by Tal Sholklapper, filed Dec. 3, 2012 as U.S. Appl. No. 61/732,926.
Office Action dated May 18, 2017, U.S. Appl. No. 14/441,766, filed May 8, 2015.
Final Office Action dated Dec. 12, 2017, U.S. Appl. No. 14/441,766, filed May 8, 2015.
Advisory Action dated Apr. 20, 2018, U.S. Appl. No. 14/441,766, filed May 8, 2015.
Office Action dated Aug. 6, 2018, U.S. Appl. No. 14/441,766, filed May 8, 2015.
Office Action dated Feb. 27, 2019, U.S. Appl. No. 14/441,766, filed May 8, 2015.
Office Action dated Sep. 11, 2019, U.S. Appl. No. 14/441,766, filed May 8, 2015.
Notice of Allowance dated May 6, 2020, U.S. Appl. No. 14/441,766, filed May 8, 2015.
Foreign communication from the priority application—International Search Report and Written Opinion, for PCT/US2013/069166, dated Jan. 29, 2014.
Foreign communication from the priority application—International Preliminary Report on Patentability, for PCT/US2013/069166, dated May 12, 2015.
Minakshi, Manickam, et al., "The Anodic Behavior of Planar and Porous Zinc Electrodes in Alkaline Electrolyte," Electrochemical and Solid-State Letters, 2010, pp. A77-A80, vol. 13, No. 7, The Electrochemical Society.
"Energy Storage Update," CUNY Energy Institute, Nov. 15, 2011.
Foreign Communication from a related application—First Examination Report of Australian Patent Application No. 2013342282, dated Jun. 29, 2017.
Foreign Communication from a related Application—Examination Report No. 2 of Australian Patent Application No. 2013342282, dated May 30, 2018.
Foreign Communication from a related Application—Notice of Acceptance of Australian Patent Application No. 2013342282, dated Jul. 2, 2018.
Foreign communication from a related counterpart application—First Office Action of Canada Application No. 2,890,711, dated Nov. 26, 2019.
Foreign communication from a related counterpart application—First Office Action of Chinese Application No. 201380068888.6, with English translation, dated Sep. 2, 2016.
Foreign communication from a related counterpart application—Second Office Action of Chinese Application No. 201380068888.6, with English translation, dated Apr. 25, 2017.
Foreign Communication from a related application—Third Office Action of Chinese Application No. 201380068888.6, with English summary, dated Jan. 11, 2018.
Foreign Communication from a related application—Notification to Go through Formalities of Registration of Chinese Application No. 201380068888.6, with English summary, dated Aug. 3, 2018.
Foreign Communication from a related application—Examination Report of Eurasian Patent Application No. 201590781/31, with English translation, dated Dec. 14, 2016.
Foreign Communication from a related application—Examination Report of Eurasian Patent Application No. 201590781/31, with English translation, dated Apr. 26, 2018.
Foreign Communication from a related application—Notification on Readiness to Grant of Eurasian Patent Application No. 201590781/31, with English translation, dated May 17, 2019.
Foreign communication from a related counterpart application—Extended European Search Report of European Patent Application No. 13853759.2, dated May 24, 2016.

(56) References Cited

OTHER PUBLICATIONS

Foreign Communication from a related counterpart application—Examination Report of European Patent Application No. 13853759.2, dated Nov. 10, 2017.
Foreign Communication from a related counterpart application—Office Action of European Patent Application No. 13853759.2, dated Dec. 18, 2019.
Foreign Communication from a related application—Notification of Reasons for Refusal of Japanese Patent Application No. 2015-541926, with machine translation, dated Aug. 22, 2017.
Foreign Communication from a related application—Final Office Action of Japanese Patent Application No. 2015-541926, with machine translation, dated Apr. 3, 2018.
Foreign Communication from a related application—Decision of Refusal of Japanese Patent Application No. 2015-541926, with machine translation, dated Nov. 6, 2018.
Foreign Communication from a related application—Office Action-Appeal Board of Japanese Patent Application No. 2015-541926, with machine translation, dated Mar. 3, 2020.
Foreign Communication from a related application—Final Office Action-Appeal Board of Japanese Patent Application No. 2015-541926, with machine translation, dated Jul. 14, 2020.
Foreign Communication from a related application—First Office Action of Korean Patent Application No. 10-2015-7015067, dated Jan. 29, 2019.
Foreign Communication from a related application—Notice of Allowance of Korean Patent Application No. 10-2015-7015067, dated Jul. 13, 2019.
Foreign Communication from a related application—Notice of Allowance of South African Patent Application No. 2015/04068, dated Jul. 29, 2019.

The half-cell reactions are:

$Zn_{(s)} + 2OH^-_{(aq)} \rightarrow ZnO_{(s)} + H_2O_{(l)} + 2e^-$  [E° = -1.28V]

First election reaction at the cathode:

$\left. \begin{array}{l} MnO_2 + H_2O + e^- \rightarrow MnOOH = OH^- \\ 2MnOOH \rightleftharpoons Mn_2O_3 + H_2O \end{array} \right\} 2MnO_{2(s)} + H_2O_{(l)} + 2e^- \rightarrow Mn_2O_{3(s)} + 2OH^-_{(aq)}$  [E° = +0.15V]

The second electron reaction at the cathode:

$3MnOOH + e^- \rightarrow Mn_3O_4 + OH^- + H_2O$  [E° = +0.59V]

The overall reaction is:

$2MnO_2 + Zn_{(s)} + H_2O_{(l)} + 2e^- \rightleftharpoons Mn_2O_{3(s)} + ZnO_{(s)} + H_2O$  [E° = 1.43V]

*FIG. 1*

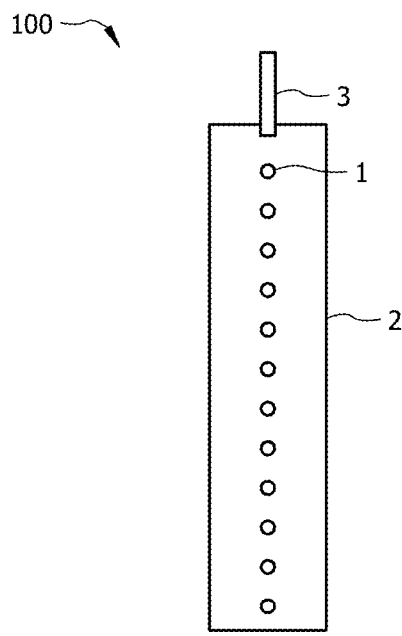

*FIG. 2*

SECONDARY ZINC-MANGANESE DIOXIDE BATTERIES FOR HIGH POWER APPLICATIONS

CROSS-REFERENCE TO RELATED APPLICATIONS

This application is a continuation of U.S. patent application Ser. No. 14/441,766 filed on May 8, 2015 and entitled, "Secondary Zinc-Manganese Dioxide Batteries for High Power Applications," which is a national stage application filing under 35 U.S.C. 371 of International Application No. PCT/US2013/069166 filed Nov. 8, 2013, entitled "Secondary zinc-manganese dioxide batteries for high power applications," which claims the benefit of U.S. Provisional Application Nos. 61/724,873 filed on Nov. 9, 2012 and 61/732,926 filed on Dec. 3, 2012, each of which are incorporated herein by reference in their entirety for all purposes.

STATEMENT REGARDING FEDERALLY SPONSORED RESEARCH OR DEVELOPMENT

The invention described and claimed herein was made in part utilizing funds supplied by the U.S. Department of Energy under Contract No. DE-AR0000150. The Government has certain rights in this invention.

REFERENCE TO A MICROFICHE APPENDIX

Not applicable.

BACKGROUND

This disclosure relates to methods of assembling and/or manufacturing secondary alkaline batteries. More specifically, it relates to compositions and methods for assembling and/or manufacturing secondary zinc-manganese dioxide batteries for high power applications.

As the world population increases and the available resources are finite, energy production and storage is of paramount importance to the modern contemporary society. An important class of energy storage systems is represented by rechargeable batteries, also known as secondary batteries, secondary electrochemical cells or secondary cells. Secondary batteries represent an excellent class of electrical energy storage technologies for matching energy consumption with production, especially for the integration of renewable sources; however the development of secondary batteries is limited in part by the available materials (e.g., electrodes, electrolyte, etc.) and strategies for assembling such batteries.

Secondary batteries most commonly include lead-acid batteries, nickel-cadmium (NiCd) batteries, nickel-metal hydride (NiMH) batteries, lithium-ion (Li-ion) batteries, and lithium-ion polymer (Li-ion polymer) batteries. Recently, secondary alkaline batteries have also been developed. Most commercial alkaline batteries are primary use (e.g., primary batteries, primary electrochemical cells or primary cells), meaning that after a single discharge primary batteries are disposed of and replaced. Primary alkaline batteries are produced in high volume at low cost by numerous commercial manufacturers.

Secondary alkaline batteries have recently come to market based on technology developed by Battery Technologies Inc. in Canada (U.S. Pat. No. 4,957,827), which was licensed to Pure Energy, Grandcell, EnviroCell, and Rayovac. These secondary alkaline batteries require proprietary chargers meant to improve cycleability (U.S. Pat. No. 7,718,305). Furthermore, the lifetime of the secondary alkaline batteries is limited due to the high depth of discharge these batteries experience in commercial applications. Due to these limitations, secondary alkaline batteries have not achieved widespread adoption to date.

The state of the art cathode design for both primary and secondary alkaline batteries typically includes an active (i.e., electroactive) material (e.g., nickel oxide, silver oxide, manganese dioxide ($MnO_2$), etc.) and a conductor (i.e., conductive, conducting) material (typically graphite) with some additives. The cathode materials are all compacted and pressed into a cavity, which is either tubular or planar, along with an anode and an electrolyte solution that has been absorbed into a separator material.

Zn—$MnO_2$ batteries are well known as primary alkaline batteries, but the irreversibility associated with the manganese dioxide ($MnO_2$) electrode and dendrite formation at the zinc (Zn) electrode upon cycling, have limited the application of Zn—$MnO_2$ batteries as a secondary batteries. Efforts to develop secondary Zn—$MnO_2$ batteries date back more than 40 years, with many unsuccessful attempts made to commercialize it. Some of the problems associated with Zn electrodes include shape change and dendritic shorting, and some of the problems associated with $MnO_2$ electrodes are manganese oxides-related insolubility and reaction irreversibility, and all these problems limit the cycle life of secondary Zn—$MnO_2$ batteries.

A major shortcoming of Zn electrodes is a limited cycle life caused by material migration/shape change and dendritic shorting. In particular, the Zn electrode in nickel-zinc battery systems has a tendency to become misshapen due to anisotropic growth of the Zn deposited on the electrode during repeated charging. To reduce shape change, many approaches have been tried with varying degrees of success, including modifications to electrolyte, zinc electrode design, or cell design. These approaches generally involve reducing either the solubility or the concentration gradients of the zinc in the electrolyte. For example, U.S. Pat. Nos. 4,358,517 and 5,863,676 disclose methods involving the use of calcium oxide or hydroxide additives to the zinc electrode.

To reduce the likelihood of dendritic shorting, microporous barrier films, positioned between the electrodes, have been tried. Most recently, micro-porous polyolefin separators (e.g., CELGARD battery separators) have had some success, but these materials are quite expensive. A sealed starved mode of cell operation is also thought to be beneficial with respect to elimination of dendrites. Oxygen generated on an overcharge of a positive nickel oxide electrode is thought to oxidize metallic zinc dendrites. Since all zinc electrodes evolve small amounts of hydrogen gas on standing, some means of oxidizing hydrogen may also be used in a sealed cell, or else the cell pressure may increase without limit.

Another approach to improving cycle life involves modifications to the battery electrolyte. In this regard, many different additives to the electrolyte have been tried. The modifications to the electrolyte typically have as their object to reduce the solubility of zinc, and thereby reduce shape change. Typical examples of this approach include fluoride/carbonate mixtures, as disclosed in U.S. Pat. No. 5,453,336 and borates, phosphates, and arsenates mixtures, as disclosed in U.S. Pat. No. 5,215,836.

Some alkaline batteries having a Zn-based anode mitigate dendrite formation by allowing an electrolyte solution to flow rather than remain static in a separator. Increased cycle life has been demonstrated with NiOOH/Zn batteries (PCT Application No. U.S. 2010/052582, WO 2011/047105). In such a secondary alkaline battery, the anode (e.g., a Ni-coated plate substrate for Zn deposition), and the cathode (e.g., a sintered NiOOH sheet) are structurally stable (even without support) and are thus easily inserted into a battery system with a flowing electrolyte solution. However, this battery system has not yet been applied to Zn—$MnO_2$ batteries due to the undesirable irreversibility associated with the $MnO_2$ cathode.

The development of a material phase of $Mn_3O_4$ (product of second electron reaction at a battery cathode) that cannot be recharged (re-oxidized) to gamma phase $MnO_2$ also reduces the cycle life of the battery and has prevented past cells comprising $MnO_2$ from achieving more than 50 cycles. Many approaches have been tried to improve the cycle life of electrolytic manganese dioxide. For example, U.S. Pat. No. 3,024,297 describes the formation of a cathode depolarizer mix. German Patent No. 3,337,568 describes titanium doping of electrolytic manganese dioxide for improved cycle life.

As such, there exists a need for improved secondary alkaline batteries employing Zn-based anodes and $MnO_2$-based cathodes and methods of making same.

SUMMARY

In an embodiment, a secondary Zn—$MnO_2$ battery comprises a battery housing, a $MnO_2$ cathode, a Zn anode, and an electrolyte solution. The $MnO_2$ cathode, the Zn anode, and the electrolyte solution are disposed within the battery housing, and the $MnO_2$ cathode comprises a MnO2 cathode mixture and a current collector. The $MnO_2$ cathode mixture is in electrical contact with at least a portion of an outer surface of the current collector, and the $MnO_2$ cathode has a porosity of from about 5 vol. % to about 90 vol. %, based on the total volume of the $MnO_2$ cathode mixture of the $MnO_2$ cathode. The Zn anode and the $MnO_2$ cathode capacities may be balanced. At least one of the Zn anode or the $MnO_2$ cathode may comprise a pasted configuration. At least one of the $MnO_2$ cathode or the Zn anode may have a thickness of from about 100 microns to about 1,000 microns. At least one of the $MnO_2$ cathode or the Zn anode may have a thickness of about 400 microns. At least one of the $MnO_2$ cathode or the Zn anode may be further wrapped in an electrode separator membrane. The electrode separator membrane may comprise a polymeric membrane, a sintered polymer film membrane, a polyolefin membrane, a polyolefin nonwoven membrane, a cellulose membrane, a cellophane, a battery-grade cellophane, a sintered polyolefin film membrane, a hydrophilically modified polyolefin membrane, or any combinations thereof. The $MnO_2$ cathode mixture may comprise $MnO_2$ in an amount of from about 45 wt. % to about 80 wt. %, an electronically conductive material in an amount of from about 10 wt. % to about 45 wt. %, and a binder in an amount of from about 2 wt. % to about 10 wt. %, based on a total weight of the $MnO_2$ cathode mixture. The $MnO_2$ may comprise electrolytic manganese dioxide, the electronically conductive material may comprise carbon, graphite, graphite powder, graphite powder flakes, graphite powder spheroids, carbon black, activated carbon, conductive carbon, amorphous carbon, glassy carbon, or any combination thereof; and the binder may comprise a polymer; a fluoropolymer, polytetrafluoroethylene (PTFE), a copolymer of tetrafluoroethylene and propylene; polyvinylidene fluoride (PVDF), a copolymer of styrene and butadiene, styrene-butadiene rubber (SBR); a conducting polymer, polyaniline, polypyrrole, poly(3,4-ethylenedioxylthiophene) (PEDOT), copolymers of 3,4-ethylenedioxylthiophene with various co-monomers (e.g., PEDOT with various dopants), a copolymer of 3,4-ethylenedioxylthiophene and styrenesulfonate (PEDOT:PSS), polyvinyl alcohol (PVA), hydroxymethyl cellulose (HMC), carboxymethyl cellulose (CMC), or any combination thereof. The $MnO_2$ cathode mixture may also include a metal, Bi, Sr, Ca, Ba, an oxide thereof, a hydroxides thereof, a nitrate thereof, a chlorides thereof, or any combination thereof. The $MnO_2$ cathode may comprise a pasted $MnO_2$ cathode. The $MnO_2$ cathode may comprise a first $MnO_2$ cathode dried sheet, a second $MnO_2$ cathode dried sheet, and the current collector. The first $MnO_2$ cathode dried sheet may be pressed onto a first side of the current collector, the second $MnO_2$ cathode dried sheet may be pressed onto a second side of the current collector, and the first and the second $MnO_2$ cathode dried sheets may be pressed onto their respective sides of the current collector at a pressure of from about 3,000 psi to about 10,000 psi. The $MnO_2$ cathode mixture may be in electrical contact with both the first side and the second side of the current collector. The current collector may comprise a porous metal collector, a metal conductive mesh, a metal conductive interwoven mesh, a metal conductive expanded mesh, a metal conductive screen, a metal conductive plate, a metal conductive foil, a metal conductive perforated plate, a metal conductive perforated foil, a metal conductive perforated sheet, a sintered porous metal conductive sheet, a sintered metal conductive foam, an expanded conductive metal, a perforated conductive metal, or any combination thereof. The current collector may comprise a metal collector pocketed assembly. The current collector may comprise a current collector substrate comprising graphite, carbon, a metal, an alloy, steel, copper, nickel, silver, platinum, brass, or any combination thereof. The current collector may comprise a metal, nickel, silver, cadmium, tin, lead, bismuth, or any combinations thereof deposited on the current collector substrate. The current collector may comprise a current collector tab, and the current collector tab may be in electrical contact with an outer surface of the $MnO_2$ cathode.

In some embodiments, the secondary Zn—$MnO_2$ battery may comprise a non-flow secondary Zn—$MnO_2$ battery, the battery housing may comprise a non-flow battery housing, wherein the Zn anode comprises a non-flow cell Zn anode, and the electrolyte solution may comprise a non-flow cell electrolyte solution. The non-flow secondary Zn—$MnO_2$ battery may comprise a prismatic configuration. The non-flow cell Zn anode may comprise a non-flow cell Zn anode mixture and a current collector, and the non-flow cell Zn anode mixture may be in electrical contact with at least a portion of an outer surface of the current collector. The non-flow cell Zn anode may have a porosity of from about 5 vol. % to about 90 vol. % based on the total volume of the non-flow cell Zn anode mixture of the non-flow cell Zn anode. The non-flow cell Zn anode mixture may comprise Zn in an amount of from about 50 wt. % to about 90 wt. %, ZnO in an amount of from about 5 wt. % to about 20 wt. %, an electronically conductive material in an amount of from about 5 wt. % to about 20 wt. %, and a binder in an amount of from about 2 wt. % to about 10 wt. %, based on the total weight of the non-flow cell Zn anode mixture. The non-flow cell Zn anode may comprise a pasted non-flow cell Zn anode. The non-flow cell electrolyte solution may comprise a hydroxide, a potassium hydroxide, a sodium hydroxide, a lithium hydroxide, or any combination thereof in a concentration of from about 1 wt. % to about 50 wt. % based on the total weight of the non-flow cell electrolyte solution. The non-flow secondary Zn—MnO$_2$ battery may be characterized by a cycle life of equal to or greater than about 5,000 cycles.

In some embodiments, the secondary Zn—MnO$_2$ battery comprises a flow-assisted secondary Zn—MnO$_2$ battery, wherein the battery housing comprises a flow-assisted battery housing, wherein the Zn anode comprises a flow-assisted cell Zn anode, and wherein the electrolyte solution comprises a flow-assisted cell electrolyte solution. The flow-assisted secondary Zn—MnO$_2$ battery may comprise a MnO$_2$ cathode plate, and the plate may have flat surfaces. The flow-assisted cell Zn anode may comprise electrodeposited Zn and a current collector, and the electrodeposited Zn may be disposed on and in electrical contact with the current collector. The flow-assisted cell electrolyte solution may comprise a hydroxide, potassium hydroxide, sodium hydroxide, lithium hydroxide, or combinations thereof in a concentration of from about 1 wt. % to about 50 wt. % based on the total weight of the non-flow cell electrolyte solution. The flow-assisted cell electrolyte solution may comprise ZnO in an amount of from about 0 g/L to about 200 g/L. The flow-assisted secondary Zn—MnO2 battery may be configured to continuously circulate the flow-assisted cell electrolyte solution through the flow-assisted battery housing.

In an embodiment, a method for producing energy comprises discharging a non-flow secondary Zn—MnO$_2$ battery to a discharge voltage to produce energy, charging the non-flow secondary Zn—MnO$_2$ battery to a charge voltage, and repeating the discharging and the charging of the flow-assisted secondary Zn—MnO$_2$ battery at least once. The non-flow secondary Zn—MnO$_2$ battery comprises: a non-flow battery housing, a MnO$_2$ cathode, a non-flow cell Zn anode, and a non-flow cell electrolyte solution. The MnO$_2$ cathode, the non-flow cell Zn anode, and the non-flow cell electrolyte solution are supported within the non-flow battery housing, and at least a portion of the Zn of the non-flow cell Zn anode is oxidized during the discharging. At least a portion of the ZnO from the non-flow cell Zn anode mixture is reduced to Zn during the charging, and the non-flow secondary Zn—MnO$_2$ battery is characterized by a cycle life of equal to or greater than about 5,000 cycles. The MnO$_2$ cathode may comprise a MnO$_2$ cathode mixture and a current collector. The MnO$_2$ cathode mixture may be in electrical contact with at least a portion of an outer surface of the current collector, and the MnO$_2$ cathode may have a porosity of from about 5 vol. % to about 90 vol. % based on the total volume of the MnO$_2$ cathode mixture of the MnO$_2$ cathode. The non-flow cell Zn anode may comprise a non-flow cell Zn anode mixture and a current collector. The non-flow cell Zn anode mixture may be in electrical contact with at least a portion of an outer surface of the current collector, and the non-flow cell Zn anode may have a porosity of from about 5 vol. % to about 90 vol. % based on the total volume of the non-flow cell Zn anode mixture of the non-flow cell Zn anode. The non-flow cell Zn anode mixture may comprise Zn in an amount of from about 50 wt. % to about 90 wt. %, ZnO in an amount of from about 5 wt. % to about 20 wt. %, an electronically conductive material in an amount of from about 5 wt. % to about 20 wt. %, and a binder in an amount of from about 2 wt. % to about 10 wt. %, based on the total weight of the non-flow cell Zn anode mixture. The non-flow cell electrolyte solution may comprise a hydroxide, a potassium hydroxide, a sodium hydroxide, a lithium hydroxide, or any combination thereof in a concentration of from about 1 wt. % to about 50 wt. % based on the total weight of the non-flow cell electrolyte solution. The non-flow secondary Zn—MnO$_2$ battery may be charged when assembled.

In an embodiment, a method for producing energy comprises charging the flow-assisted secondary Zn—MnO$_2$ battery to a charge voltage, discharging the flow-assisted secondary Zn—MnO$_2$ battery to a discharge voltage to produce energy, and continuously circulating the flow-assisted cell electrolyte solution through the flow-assisted battery housing during the charging and the discharging. The flow-assisted secondary Zn—MnO$_2$ battery comprises: a flow-assisted battery housing, a MnO$_2$ cathode, a flow-assisted cell Zn anode comprising a current collector, and a flow-assisted cell electrolyte solution. The MnO$_2$ cathode, the flow-assisted cell Zn anode, and the flow-assisted cell electrolyte solution are supported within the flow-assisted battery housing, and ZnO from the flow-assisted cell electrolyte solution is deposited as electrodeposited Zn on the current collector of the flow-assisted cell Zn anode during the charging. At least a portion of the electrodeposited Zn of the flow-assisted cell Zn anode is oxidized and transferred back into the flow-assisted cell electrolyte solution during the discharging. The method may also include discharging the flow-assisted secondary Zn—MnO$_2$ battery to a final voltage below the discharge voltage. The electrodeposited Zn of the flow-assisted cell Zn anode may be completely removed from the current collector. Continuously circulating the flow-assisted cell electrolyte solution through the flow-assisted battery housing may occur during the discharging of the flow-assisted secondary Zn—MnO$_2$ battery to a final voltage below the discharge voltage. The MnO$_2$ cathode may comprise a MnO$_2$ cathode mixture and a second current collector, and the MnO$_2$ cathode mixture may be in electrical contact with at least a portion of an outer surface of the second current collector. The MnO$_2$ cathode may have a porosity of from about 5 vol. % to about 90 vol. % based on the total volume of the MnO$_2$ cathode mixture of the MnO$_2$ cathode. The flow-assisted cell electrolyte solution may comprise a hydroxide, a potassium hydroxide, a sodium hydroxide, a lithium hydroxide, or any combination thereof in a concentration of from about 1 wt. % to about 50 wt. % based on the total weight of the non-flow cell electrolyte solution. The flow-assisted cell electrolyte solution may comprise ZnO in an amount of from about 0 g/L to about 200 g/L.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 1 displays the net stoichiometry of a Zn—MnO$_2$ battery.

FIG. 2 displays a cross-section schematic of an embodiment of a freestanding, self-supported MnO$_2$ cathode.

DETAILED DESCRIPTION

Figure 3A:
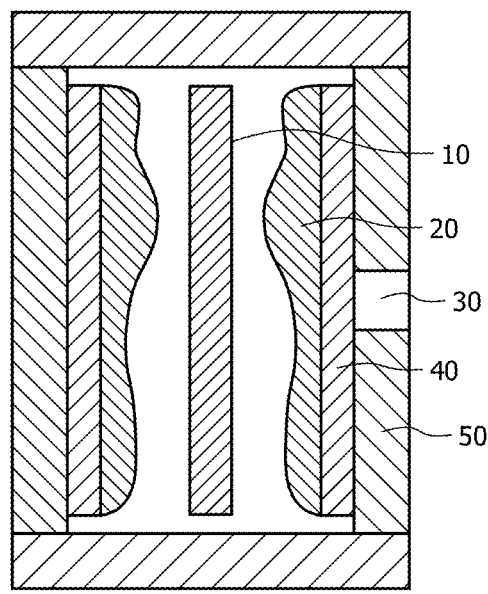
FIG. 3A displays a top view schematic of an embodiment of a flow-assisted secondary Zn—MnO$_2$ battery.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Disclosed herein are embodiments of secondary Zn—MnO$_2$ batteries and methods of making and using same. In an embodiment, the secondary Zn—MnO$_2$ batteries may comprise a Zn anode, a MnO$_2$ cathode and an electrolyte. In some embodiments, the secondary Zn—MnO$_2$ batteries of the type disclosed herein may employ a non-flow configuration, and such batteries may be referred to as "non-flow secondary Zn—MnO$_2$ batteries" for purposes of the present disclosure. In other embodiments, the secondary Zn—MnO$_2$ batteries of the type disclosed herein may employ a flow-assisted configuration, and such batteries may be referred to as "flow-assisted secondary Zn—MnO$_2$ batteries" for purposes of the present disclosure.

Without wishing to be limited by theory, the two electrodes (i.e., a Zn anode and a MnO$_2$ cathode) that are part of the secondary Zn—MnO$_2$ battery have different electrochemical potentials which are dictated by the chemistry that occurs at each electrode, and when such electrodes are connected to an external device, electrons flow from the more negative to the more positive potential electrode and electrical energy can be extracted by the external device/circuit. The charge balance in a secondary Zn—MnO$_2$ battery can be maintained by the transport of ions through an ion transporter, such as for example an electrolyte. The net stoichiometry of a Zn—MnO$_2$ battery is depicted in FIG. 1, wherein the standard cell potential associated with a Zn—MnO$_2$ battery is about 1.43 V.

Disclosed herein are materials, methods, and systems for developing secondary Zn—MnO$_2$ batteries comprising electrodes and an electrolyte, wherein the battery can be either in a non-flow configuration or in a flow-assisted configuration. Each of the components of the secondary Zn—MnO$_2$ batteries as well as methods of making and using same (e.g., electrodes, active electrode materials, electrolyte compositions, electrochemical operation techniques, etc.) will be described in more detail herein.

In an embodiment, a secondary Zn—MnO$_2$ battery may comprise a battery housing, a MnO$_2$ cathode, a Zn anode, and an electrolyte solution; wherein the MnO$_2$ cathode, the Zn anode, and the electrolyte solution are supported within the battery housing. As will be appreciated by one of skill in the art, and with the help of this disclosure, during the operating life of the battery, while the battery is in a discharge phase (e.g., the battery is producing energy, thereby acting as a galvanic cell), the MnO$_2$ cathode is a positive electrode and the Zn anode is a negative electrode; and while the battery is in a recharging phase (e.g., the battery is consuming energy, thereby acting as an electrolytic cell), the polarity of the electrodes is reversed, i.e., the MnO$_2$ cathode becomes the negative electrode and the Zn anode becomes the positive electrode.

As will be appreciated by one of skill in the art, and with the help of this disclosure, the number of electrodes in a secondary Zn—MnO$_2$ battery is dependent upon the desired parameters for such secondary Zn—MnO$_2$ battery. In an embodiment, the number and size of each of the electrodes (e.g., Zn anode, MnO$_2$ cathode) in a secondary Zn—MnO$_2$ battery can be chosen based on the properties of the electrodes, such that Zn anode and MnO$_2$ cathode capacities are balanced.

Non-Flow Secondary Zn—MnO$_2$ Battery

In an embodiment, the secondary Zn—MnO$_2$ battery comprises a non-flow secondary Zn—MnO$_2$ battery, wherein the battery housing comprises a non-flow battery housing, the Zn anode comprises a non-flow cell Zn anode, and the electrolyte solution comprises a non-flow cell electrolyte solution.

In an embodiment, the non-flow secondary Zn—MnO$_2$ battery comprises the non-flow battery housing, the non-flow cell Zn anode, the MnO$_2$ cathode, and the non-flow cell electrolyte solution, wherein the non-flow cell Zn anode, the $MnO_2$ cathode, and the non-flow cell electrolyte solution may be supported/located inside the non-flow battery housing. In an embodiment, the non-flow battery housing comprises a molded box or container, such as for example a thermoplastic polymer molded box (e.g., a polysulfone molded box), a thermoplastic olefin polymer molded box, etc.

In an embodiment, the electrodes (e.g., non-flow cell Zn anode, $MnO_2$ cathode) of a non-flow secondary Zn—$MnO_2$ battery may be in any prismatic geometry/configuration. In an embodiment, the non-flow secondary Zn—$MnO_2$ battery excludes a non-prismatic geometry/configuration. While prismatic configurations are described herein, one of ordinary skill in the art will appreciate that other, non-prismatic designs can be used. For example, a cylindrical or other design can also be used with the appropriate configuration of the electrodes as described herein.

In an embodiment, the non-flow cell Zn anode comprises a non-flow cell Zn anode mixture and a current collector. While the present disclosure will be discussed in detail in the context of non-flow cell zinc anodes, it should be understood that other materials, such as for example other metals, aluminum, nickel, magnesium, etc., may be used as non-flow cell anodes or anode materials. Without wishing to be limited by theory, Zn as part of the non-flow cell Zn anode mixture is an electrochemically active material, and may participate in a redox reaction (according to the reactions depicted in FIG. 1), thereby contributing to the overall voltage of the battery, while the current collector has the purpose of conducting current by enabling electron flow and does not significantly contribute, or in some embodiments does not contribute at all, to the overall voltage of the battery.

In an embodiment, the non-flow cell Zn anode mixture comprises Zn, zinc oxide (ZnO), an electronically conductive material, and a binder. In an embodiment, Zn may be present in the non-flow cell Zn anode mixture in an amount of from about 50 wt. % to about 90 wt. %, alternatively from about 60 wt. % to about 80 wt. %, or alternatively from about 65 wt. % to about 75 wt. %, based on the total weight of the non-flow cell Zn anode mixture. In an embodiment, Zn may be present in the non-flow cell Zn anode mixture in an amount of about 85 wt. %, based on the total weight of the non-flow cell Zn anode mixture.

In an embodiment, ZnO may be present in the non-flow cell Zn anode mixture in an amount of from about 5 wt. % to about 20 wt. %, alternatively from about 5 wt. % to about 15 wt. %, or alternatively from about 5 wt. % to about 10 wt. %, based on the total weight of the non-flow cell Zn anode mixture. In an embodiment, ZnO may be present in the non-flow cell Zn anode mixture in an amount of about 10 wt. %, based on the total weight of the non-flow cell Zn anode mixture. As will be appreciated by one of skill in the art, and with the help of this disclosure, the purpose of the ZnO in the non-flow cell Zn anode mixture is to provide a source of Zn during the recharging steps.

In an embodiment, the electronically conductive material may be present in the non-flow cell Zn anode mixture in an amount of from about 5 wt. % to about 20 wt. %, alternatively from about 5 wt. % to about 15 wt. %, or alternatively from about 5 wt. % to about 10 wt. %, based on the total weight of the non-flow cell Zn anode mixture. In an embodiment, the electronically conductive material may be present in the non-flow cell Zn anode mixture in an amount of about 10 wt. %, based on the total weight of the non-flow cell Zn anode mixture. As will be appreciated by one of skill in the art, and with the help of this disclosure, the electronically conductive material is used in the non-flow cell Zn anode mixture as a conducting agent, e.g., to enhance the overall electronic conductivity of the non-flow cell Zn anode mixture.

Nonlimiting examples of electronically conductive material suitable for use in this disclosure include carbon, graphite, graphite powder, graphite powder flakes, graphite powder spheroids, carbon black, activated carbon, conductive carbon, amorphous carbon, glassy carbon, and the like, or combinations thereof.

In an embodiment, the electronically conductive material suitable for use in this disclosure comprises a graphite powder having a particle size of from about 10 microns to about 95 microns, alternatively from about 15 microns to about 90 microns, or alternatively from about 17 microns to about 85 microns.

In an embodiment, the electronically conductive material suitable for use in this disclosure comprises a graphite powder having a specific Brunauer-Emmett-Teller (BET) area of from about 5 $m^2/g$ to about 30 $m^2/g$, alternatively from about 6 $m^2/g$ to about 29 $m^2/g$, or alternatively from about 7 $m^2/g$ to about 28 $m^2/g$. The specific BET area is generally measured by adsorption using a BET isotherm, and this type of measurement has the advantage of measuring surface of fine structures and deep texture on particles.

Generally, a binder functions to hold the electroactive material particles (e.g., Zn used in anode, $MnO_2$ used in a cathode, etc.) together and in contact with the current collector. In an embodiment, the binder may be present in the non-flow cell Zn anode mixture in an amount of from about 2 wt. % to about 10 wt. %, alternatively from about 2 wt. % to about 7 wt. %, or alternatively from about 4 wt. % to about 6 wt. %, based on the total weight of the non-flow cell Zn anode mixture. In an embodiment, the binder may be present in the non-flow cell Zn anode mixture in an amount of about 5 wt. %, based on the total weight of the non-flow cell Zn anode mixture.

In an embodiment, the binder may comprise a polymer; a fluoropolymer, polytetrafluoroethylene (PTFE), a copolymer of tetrafluoroethylene and propylene; polyvinylidene fluoride (PVDF), a copolymer of styrene and butadiene, styrene-butadiene rubber (SBR); a conducting polymer, polyaniline, polypyrrole, poly(3,4-ethylenedioxylthiophene) (PEDOT), copolymers of 3,4-ethylenedioxylthiophene with various co-monomers (e.g., PEDOT with various dopants), a copolymer of 3,4-ethylenedioxylthiophene and styrene-sulfonate (PEDOT:PSS), polyvinyl alcohol (PVA), hydroxymethyl cellulose (HMC), carboxymethyl cellulose (CMC), and the like, or combinations thereof. In an embodiment, the binder used in a non-flow cell Zn anode mixture comprises TEFLON, which is a PTFE commercially available from DuPont.

In an embodiment the binder comprises a binder emulsion, wherein the concentration of the solids in the binder emulsion may be from about 1 wt. % to about 7 wt. %, alternatively from about 2 wt. % to about 6 wt. %, alternatively from about 3 wt. % to about 5 wt. %, based on the total weight of the binder emulsion. As will be appreciated by one of skill in the art, and with the help of this disclosure, the use of an emulsion as a binder reduces the amount of the binder available in the non-flow cell Zn anode mixture. For example, if the binder is present in an amount of about 5 wt. % in the non-flow cell Zn anode mixture, and the binder used is a 50 wt. % binder emulsion, the amount of binder in the binder is actually 2.5 wt. % (as opposed to 5 wt. %).

In an embodiment, the non-flow cell Zn anode mixture may be optionally filtered before any further processing, to ensure that no large clumps of material are present within the mixture, and that the composition of the non-flow cell Zn anode may be uniform.

In some embodiments, the current collector comprises a porous metal collector further comprising a variety of collector configurations, such as for example a metal conductive mesh, a metal conductive interwoven mesh, a metal conductive expanded mesh, a metal conductive screen, a metal conductive plate, a metal conductive foil, a metal conductive perforated plate, a metal conductive perforated foil, a metal conductive perforated sheet, a sintered porous metal conductive sheet, a sintered metal conductive foam, an expanded conductive metal, a perforated conductive metal, and the like, or combinations thereof. Other porous collector configurations of the current collector will be appreciated by one of skill in the art in light of this disclosure.

In other embodiments, the current collector comprises a metal collector pocketed assembly, wherein different pockets of the assembly may comprise various electrode materials (e.g., non-flow cell Zn anode materials, $MnO_2$ cathode materials, etc.). Other current collector configurations will be apparent to one of skill in the art, and with the help of this disclosure.

In an embodiment, the current collector may be characterized by a thickness of from about 150 microns to about 350 microns, alternatively from about 200 microns to about 320 microns, or alternatively from about 270 microns to about 290 microns.

In an embodiment, the current collector comprises a current collector substrate comprising graphite, carbon, a metal, an alloy, steel (e.g., 304, 316, 302, etc.), copper, nickel, silver, platinum, brass, or combinations thereof. In an embodiment, the current collector may further comprise a metal deposited (e.g., electroplated, electrodeposited, etc.) on the current collector substrate, such as for example nickel, silver, cadmium, tin, lead, bismuth, or combinations thereof. In an embodiment, the current collector comprises a nickel-plated steel mesh, an expanded nickel-plated steel mesh sheet, or combinations thereof.

In an embodiment, the current collector may further comprise a current collector tab. In such embodiment, the current collector tab may comprise a metal, nickel, copper, steel, and the like, or combinations thereof. Generally, the current collector tab provides a means of connecting the electrode (e.g., anode, Zn anode, non-flow cell Zn anode, flow-assisted cell Zn anode, cathode, $MnO_2$ cathode) to the electrical circuit of the battery. In some embodiments, the current collector tab may be connected to a current collector across an entire length of the current collector. In other embodiments, the current collector tab may be connected to a current collector across a fraction of the entire length of the current collector, such as for example, across about 5% of the entire length of the current collector, alternatively across about 10%, alternatively across about 20%, alternatively across about 30%, alternatively across about 40%, alternatively across about 50%, alternatively across about 60%, alternatively across about 70%, alternatively across about 80%, alternatively across about 90%, alternatively across about 95%, or alternatively across about 99%.

In an embodiment, the current collector tab is in electrical contact with an outer surface of the electrode (e.g., anode, Zn anode, non-flow cell Zn anode, flow-assisted cell Zn anode, cathode, $MnO_2$ cathode). In an embodiment, the current collector tab is in electrical contact with less than about 0.2% of an outer surface of the electrode (e.g., anode, Zn anode, non-flow cell Zn anode, flow-assisted cell Zn anode, cathode, $MnO_2$ cathode), alternatively less than about 0.5%, or alternatively less than about 1%.

In some embodiments, the current collector may be positioned in the center of the electrode (e.g., anode, Zn anode, non-flow cell Zn anode, flow-assisted cell Zn anode, cathode, $MnO_2$ cathode). In other embodiments, the current collector may be positioned off-center within the electrode (e.g., anode, Zn anode, non-flow cell Zn anode, flow-assisted cell Zn anode, cathode, $MnO_2$ cathode).

In an embodiment, the non-flow cell Zn anode mixture may be further mixed with a non-flow cell solvent to yield a non-flow cell Zn anode wet mixture. Nonlimiting examples of non-flow cell solvents suitable for use in the present disclosure include alcohol (e.g., isopropanol, propanol), ethers, and the like, or combinations thereof. In an embodiment, the non-flow cell solvent suitable for mixing with the non-flow cell Zn anode mixture comprises isopropanol.

In an embodiment, the non-flow cell Zn anode mixture and the non-flow cell solvent may be mixed by using any suitable methodology, such as for example in blenders, mixers, wet mixers, dry mixers, ball mills, Attritor mills, Hockmeyer mills, etc. In an embodiment, the non-flow cell Zn anode mixture and the non-flow cell solvent may be mixed in wet and/or dry conditions. In an embodiment, the non-flow cell Zn anode mixture and the non-flow cell solvent may be mixed in a mass ratio of non-flow cell Zn anode mixture to non-flow cell solvent of from about 4:1 to about 10:1, alternatively from about 5:1 to about 8:1, or alternatively from about 6:1 to about 7:1.

In an embodiment, the non-flow cell Zn anode wet mixture may be optionally filtered before any further processing, to ensure that no large clumps of material are present within the mixture, and that the composition of the non-flow cell Zn anode may be uniform.

In an embodiment, the non-flow cell Zn anode wet mixture has a pasty consistency, thereby forming a pasted non-flow cell Zn anode. In an embodiment, the non-flow cell Zn anode wet mixture may be rolled out as a non-flow cell Zn anode mixture sheet by using any suitable methodology, such as for example spreading the wet mixture on a planar surface, pouring the wet mixture in a template, rolling the wet mixture with a rolling pin, roll casting, coating, tape-casting, spray deposition, screen-printing, calendaring, isostatic pressing, uniaxial pressing, etc. In an embodiment, the non-flow cell Zn anode mixture sheet may be characterized by a thickness of from about 100 microns to about 1,000 microns, alternatively from about 300 microns to about 700 microns, or alternatively from about 400 microns to about 600 microns.

In an embodiment, the non-flow cell Zn anode mixture sheet may be dried (e.g., in an oven) at a temperature of from about 40° C. to about 80° C., alternatively from about 50° C. to about 70° C., or alternatively from about 55° C. to about 65° C., to yield a non-flow cell Zn anode dried sheet. In an embodiment, the non-flow cell Zn anode mixture sheet may be dried in an oven at a temperature of about 60° C. As will be appreciated by one of skill in the art, and with the help of this disclosure, drying the non-flow cell Zn anode mixture sheet removes at least a portion of the non-flow cell solvent from the mixture sheet.

In an embodiment, the non-flow cell Zn anode dried sheet may be pressed onto the current collector to yield the non-flow cell Zn anode. In an embodiment, the non-flow cell Zn anode dried sheet may be pressed onto the current collector under high pressure, such as for example a pressure of from about 3,000 psi to about 10,000 psi, alternatively about 5,000 psi to about 9,000 psi, or alternatively about 6,000 psi to about 8,000 psi. In an embodiment, the non-flow cell Zn anode dried sheet may be pressed onto the current collector such that the non-flow cell Zn anode mixture is in electrical contact with at least a portion of an outer surface of the current collector, e.g., the non-flow cell Zn anode mixture is in electrical contact with at least a first side of the current collector.

Alternatively, in an embodiment, the non-flow cell Zn anode wet mixture may be rolled out as a non-flow cell Zn anode mixture sheet directly onto the onto the current collector, followed by drying as previously described herein, to yield the non-flow cell Zn anode. In such embodiment, the rolling out of the non-flow cell Zn anode mixture sheet onto the current collector may be accomplished by using any suitable methodology, such as for example calendaring, iso-static pressing, uniaxial pressing, etc.

In an embodiment, the non-flow cell Zn anode may be further wrapped in an electrode separator membrane, wherein the electrode separator membrane may be heat sealed onto the non-flow cell Zn anode to yield a non-flow cell sealed Zn anode. In an embodiment, the electrode separator membrane comprises a polymeric membrane, such as for example a sintered polymer film membrane, polyolefin membrane, a polyolefin nonwoven membrane, a cellulose membrane, a cellophane, a battery-grade cellophane, a hydrophilically modified polyolefin membrane, and the like, or combinations thereof. In an embodiment, the electrode separator membrane used to seal the non-flow cell Zn anode comprises FS 2192 SG membrane, which is a polyolefin nonwoven membrane commercially available from Freudenberg, Germany. As will be appreciated by one of skill in the art, and with the help of this disclosure, the electrode separator membrane allows the electrolyte, or at least a portion and/or component thereof, to pass (e.g., cross, traverse, etc.) through the electrode separator membrane, to balance ionic flow and sustain the flow of electrons in the battery.

In an embodiment, the non-flow cell Zn anode can be characterized by a thickness of from about 100 microns to about 1,000 microns, alternatively from about 150 microns to about 600 microns, or alternatively from about 300 microns to about 500 microns. In an embodiment, the non-flow cell Zn anode can be characterized by a thickness of about 400 microns.

In an embodiment, the non-flow cell Zn anode can be a porous composite. In an embodiment, the non-flow cell Zn anode may be characterized by a porosity of from about 5 vol. % to about 90 vol. %, alternatively from about 10 vol. % to about 85 vol. %, alternatively from about 20 vol. % to about 80 vol. %, based on the total volume of the non-flow cell Zn anode mixture of the non-flow cell Zn anode. Generally, the porosity of a material (e.g., non-flow cell Zn anode mixture of the non-flow cell Zn anode, $MnO_2$ cathode mixture of the $MnO_2$ cathode, etc.) is defined as the percentage of volume that pores (i.e., voids, empty spaces) occupy based on the total volume of the material. As will be appreciated by one of skill in the art, and with the help of this disclosure, an electrode (e.g., non-flow cell Zn anode, $MnO_2$ cathode, etc.) is porous such that the electrolyte solution (e.g., non-flow cell electrolyte solution, flow-assisted cell electrolyte solution) can permeate into at least a portion of the pore volume in the electrode (e.g., non-flow cell Zn anode, $MnO_2$ cathode, etc.) and provide ionic communication to the surrounding active material (e.g., Zn, $MnO_2$, etc.).

Referring to the embodiment of FIG. 2, a freestanding, self-supported $MnO_2$ cathode 100 is depicted. The $MnO_2$ cathode 100 comprises a $MnO_2$ cathode mixture 2 surrounding a current collector 1. The current collector is connected to a current collector tab 3. Without wishing to be limited by theory, $MnO_2$ as part of the $MnO_2$ cathode mixture 2 is an electrochemically active material that may participate in a redox reaction (according to the reactions depicted in FIG. 1), thereby contributing to the overall voltage of the battery. The current collector 1 has the purpose of conducting current by enabling electron flow and does not significantly contribute to the overall voltage of the battery. As will be appreciated by one of skill in the art, and with the help of this disclosure, the current collector 1 described as part of the non-flow cell Zn anode may also be used as the current collector for the $MnO_2$ cathode 100. Further, as will be appreciated by one of skill in the art, and with the help of this disclosure, the non-flow cell Zn anode and the $MnO_2$ cathode do not share the same current collector, but a separate/distinct current collector is used for each electrode (e.g., non-flow cell Zn anode, $MnO_2$ cathode).

In an embodiment, the MnO2 cathode mixture 2 comprises MnO2, an electronically conductive material, and a binder. As will be appreciated by one of skill in the art, and with the help of this disclosure, the binder described as part of the non-flow cell Zn anode mixture may also be used as the binder for the MnO2 cathode mixture. In an embodiment, the binder used in a MnO2 cathode mixture comprises TEFLON. In an alternative embodiment, the binder used in a MnO2 cathode mixture comprises TEFLON, PEDOT, PSS, PEDOT:PSS, and/or any combination thereof.

In an embodiment, the binder may be present in $MnO_2$ cathode mixture in an amount of from about 2 wt. % to about 10 wt. %, alternatively from about 3 wt. % to about 7 wt. %, or alternatively from about 4 wt. % to about 6 wt. %, based on the total weight of the $MnO_2$ cathode mixture. In an embodiment, the binder may be present in the $MnO_2$ cathode mixture in an amount of about 5 wt. %, based on the total weight of $MnO_2$ cathode mixture. In an embodiment the binder comprises a binder emulsion, wherein the concentration of the solids in the binder emulsion may be from about 1 wt. % to about 6 wt. %, alternatively from about 2 wt. % to about 5 wt. %, alternatively from about 3 wt. % to about 5 wt. %, based on the total weight of the binder emulsion. As will be appreciated by one of skill in the art, and with the help of this disclosure, the use of an emulsion as a binder reduces the amount of the binder available in the $MnO_2$ cathode mixture. For example, if the binder is present in an amount of about 5 wt. % in the $MnO_2$ cathode mixture, and the binder used is a 50 wt. % binder emulsion, the amount of binder in the binder is actually 2.5 wt. % (as opposed to 5 wt. %).

In an embodiment, the $MnO_2$ comprises electrolytic manganese dioxide (EMD) grade powder. In an embodiment, the $MnO_2$ has a powder particle size distribution of equal to or greater than 99.5 wt. % $MnO_2$ powder particles having a maximum size of about 100 mesh (based on U.S. Sieve Series, wet testing). In an embodiment, the $MnO_2$ has a powder particle size distribution of from about 85 wt. % to about 95 wt. % $MnO_2$ powder particles having a maximum size of about 200 mesh (based on U.S. Sieve Series, wet testing). In an embodiment, the $MnO_2$ has a powder particle size distribution of equal to or greater than 60 wt. % $MnO_2$ powder particles having a maximum size of about 325 mesh (based on U.S. Sieve Series, wet testing).

In an embodiment, $MnO_2$ may be present in the $MnO_2$ cathode mixture in an amount of from about 45 wt. % to about 80 wt. %, alternatively from about 55 wt. % to about 75 wt. %, or alternatively from about 60 wt. % to about 70 wt. %, based on the total weight of the $MnO_2$ cathode mixture. In an embodiment, $MnO_2$ may be present in the $MnO_2$ cathode mixture in an amount of about 65 wt. %, based on the total weight of the $MnO_2$ cathode mixture.

In an embodiment, the electronically conductive material may be present in the $MnO_2$ cathode mixture in an amount of from about 10 wt. % to about 45 wt. %, alternatively from about 20 wt. % to about 40 wt. %, or alternatively from about 25 wt. % to about 35 wt. %, based on the total weight of the $MnO_2$ cathode mixture. In an embodiment, the electronically conductive material may be present in the $MnO_2$ cathode mixture in an amount of about 30 wt. %, based on the total weight of the $MnO_2$ cathode mixture. As will be appreciated by one of skill in the art, and with the help of this disclosure, $MnO_2$ has low electronic or electrical conductivity, hence the electronically conductive material is used in the $MnO_2$ cathode mixture as a conducting agent, e.g., to enhance the overall electronic conductivity of the $MnO_2$ cathode mixture. As will be appreciated by one of skill in the art, and with the help of this disclosure, the electronically conductive material described as part of the non-flow cell Zn anode mixture may also be used as the electronically conductive material for the $MnO_2$ cathode mixture.

In an embodiment, the $MnO_2$ cathode mixture may further comprise additives, such as for example metals, Bi, Sr, Ca, Ba, oxides thereof, hydroxides thereof, nitrates thereof, chlorides thereof, and the like, or combinations thereof.

In an embodiment, the $MnO_2$ cathode mixture may be optionally filtered before any further processing, to ensure that no large clumps of material are present within the mixture, and that the composition of the $MnO_2$ cathode may be uniform.

In an embodiment, the $MnO_2$ cathode mixture may be further mixed with a non-flow cell solvent to yield a $MnO_2$ cathode wet mixture. As will be appreciated by one of skill in the art, and with the help of this disclosure, the non-flow cell solvent described as part of a non-flow cell Zn anode assembly process may also be used as part of a $MnO_2$ cathode assembly process. In an embodiment, the non-flow cell solvent suitable for mixing with the $MnO_2$ cathode mixture comprises isopropanol.

In an embodiment, the $MnO_2$ cathode mixture and the non-flow cell anode solvent may be mixed by using any suitable methodology, such as for example in blenders, mixers, wet mixers, dry mixers, ball mills, Attritor mills, Hockmeyer mills, etc. In an embodiment, the non-flow cell Zn anode mixture and the non-flow cell solvent may be mixed in wet and/or dry conditions. In an embodiment, the $MnO_2$ cathode mixture and the non-flow cell anode solvent may be mixed in a mass ratio of $MnO_2$ cathode mixture to non-flow cell anode solvent of from about 7:1 to about 3:1, alternatively from about 5:1 to about 2:1, or alternatively from about 5:1 to about 4:1.

In an embodiment, the $MnO_2$ cathode wet mixture may display a shear thinning behavior, e.g., the $MnO_2$ cathode wet mixture is a thixotropic (i.e., shear thinning) fluid, wherein the apparent viscosity of the fluid decreases with increased stress/shear. In an embodiment, the $MnO_2$ cathode wet mixture has a pasty consistency, thereby allowing for the formation of a pasted $MnO_2$ cathode.

In an embodiment, the $MnO_2$ cathode wet mixture may be optionally filtered before any further processing, to ensure that no large clumps of material are present within the mixture, and that the composition of the $MnO_2$ cathode may be uniform.

In an embodiment, the $MnO_2$ cathode wet mixture may be rolled out as a $MnO_2$ cathode mixture sheet by using any suitable methodology, such as for example spreading the wet mixture on a planar surface, pouring the wet mixture in a template, rolling the wet mixture with a rolling pin, roll casting, coating, tape-casting, spray deposition, screen-printing, calendaring, iso-static pressing, uniaxial pressing, etc. In an embodiment, the $MnO_2$ cathode mixture sheet may be characterized by a thickness of from about 100 microns to about 1,000 microns, alternatively from about 150 microns to about 600 microns, or alternatively from about 300 microns to about 500 microns.

In an embodiment, the $MnO_2$ cathode mixture sheet may be dried (e.g., in an oven) at a temperature of from about 40° C. to about 80° C., alternatively from about 50° C. to about 70° C., or alternatively from about 55° C. to about 65° C., to yield a $MnO_2$ cathode dried sheet. In an embodiment, the non-flow cell Zn anode mixture sheet may be dried in an oven at a temperature of about 60° C. As will be appreciated by one of skill in the art, and with the help of this disclosure, drying the $MnO_2$ cathode mixture sheet removes at least a portion of the non-flow cell solvent from the mixture sheet.

In an embodiment, the $MnO_2$ cathode dried sheet may be pressed onto the current collector to yield the $MnO_2$ cathode. In an embodiment, the $MnO_2$ cathode dried sheet may be pressed onto the current collector under high pressure, such as for example a pressure of from about 3,000 psi to about 10,000 psi, alternatively about 5,000 psi to about 9,000 psi, or alternatively about 6,000 psi to about 8,000 psi. In an embodiment, the $MnO_2$ cathode dried sheet may be pressed onto the current collector such that the $MnO_2$ cathode mixture is in electrical contact with at least a portion of an outer surface of the current collector, e.g., the $MnO_2$ cathode mixture is in electrical contact with at least a first side of the current collector.

In an embodiment, a first $MnO_2$ cathode dried sheet may be pressed onto a first side of the current collector, and a second $MnO_2$ cathode dried sheet may be pressed onto a second side of the current collector to yield the $MnO_2$ cathode, such that the $MnO_2$ cathode mixture is in electrical contact with both the first side and the second side of the current collector. The $MnO_2$ cathode dried sheets (e.g., the first $MnO_2$ cathode dried sheet, the second $MnO_2$ cathode dried sheet) may be pressed onto their respective sides of the current collector at the same time. Alternatively, the $MnO_2$ cathode dried sheets (e.g., the first $MnO_2$ cathode dried sheet, the second $MnO_2$ cathode dried sheet) may be pressed onto their respective sides of the current collector at different times (e.g., sequentially).

In an alternative embodiment, the $MnO_2$ cathode wet mixture may be rolled out as a $MnO_2$ cathode mixture sheet directly onto the current collector, followed by drying as previously described herein, to yield the $MnO_2$ cathode. In such embodiment, the rolling out of the $MnO_2$ cathode mixture sheet onto the current collector may be accomplished by using any suitable methodology, such as for example calendaring, iso-static pressing, uniaxial pressing, etc.

In an embodiment, the $MnO_2$ cathode may be further wrapped in at least one electrode separator membrane, alternatively at least two electrode separator membranes, alternatively at least three electrode separator membranes, alternatively at least four electrode separator membranes, or alternatively at least five electrode separator membranes, to yield a sealed $MnO_2$ cathode. In an embodiment, the electrode separator membrane used to seal the $MnO_2$ cathode comprises cellophane. Further, as will be appreciated by one of skill in the art, and with the help of this disclosure, other numbers and configurations of electrode separator membranes, depending on the desired battery design.

In an embodiment, the $MnO_2$ cathode may be a plate with flat surfaces, wherein the plate can be characterized by a thickness of from about 100 microns to about 1,000 microns, alternatively from about 150 microns to about 600 microns, or alternatively from about 300 microns to about 500 microns. In an embodiment, the $MnO_2$ cathode can be characterized by a thickness of about 400 microns.

In an embodiment, the $MnO_2$ cathode can be a porous composite. In an embodiment, the $MnO_2$ cathode may be characterized by a porosity of from about 5 vol. % to about 90 vol. %, alternatively from about 10 vol. % to about 85 vol. %, alternatively from about 20 vol. % to about 80 vol. %, based on the total volume of the $MnO_2$ cathode mixture of the $MnO_2$ cathode.

In an embodiment, the non-flow cell electrolyte solution comprises an ion transporter such as for example an aqueous battery electrolyte or an aqueous electrolyte. In an embodiment, the aqueous battery electrolyte comprises any suitable aqueous electrolyte comprising ionic conductivity and with a pH value of about 14, alternatively less than about 14, alternatively less than about 13, or alternatively less than about 12. In the case of rechargeable batteries (e.g., secondary $Zn$—$MnO_2$ batteries, non-flow secondary $Zn$—$MnO_2$ batteries, flow-assisted secondary $Zn$—$MnO_2$ batteries, etc.), the electrolyte is important both for the active/discharging cycle of the battery (while the battery supplies a current) and for the recharging cycle when Zn may be electrodeposited to replenish the anode material (e.g., Zn anode, non-flow cell Zn anode).

In an embodiment, the non-flow cell electrolyte solution comprises a hydroxide, potassium hydroxide, sodium hydroxide, lithium hydroxide, and the like, or combinations thereof, in a concentration of from about 1 wt. % to about 50 wt. %, alternatively from about 10 wt. % to about 40 wt. %, or alternatively from about 25 wt. % to about 35 wt. %, based on the total weight of the non-flow cell electrolyte solution. In an embodiment, the non-flow cell electrolyte solution comprises potassium hydroxide in a concentration of about 30 wt. %, based on the total weight of the non-flow cell electrolyte solution.

In an embodiment, the non-flow secondary $Zn$—$MnO_2$ battery may be assembled by using any suitable methodology. In an embodiment, the non-flow secondary $Zn$—$MnO_2$ battery may comprise at least one non-flow cell Zn anode and at least one $MnO_2$ cathode. In an embodiment, the non-flow secondary $Zn$—$MnO_2$ battery may comprise more than one non-flow cell Zn anode and more than one $MnO_2$ cathode, wherein the anodes and the cathodes are assembled in an alternating configuration, e.g., the anodes and the cathodes are sandwiched together in an alternating manner. For example, if a non-flow secondary $Zn$—$MnO_2$ battery comprises two cathodes and three anodes, the electrodes would be sandwiched together in an alternating manner: anode, cathode, anode, cathode, and anode. As will be appreciated by one of skill in the art, and with the help of this disclosure, the number of electrodes in a non-flow secondary $Zn$—$MnO_2$ battery is dependent upon the desired parameters for such secondary $Zn$—$MnO_2$ battery. In an embodiment, the number of electrodes (e.g., non-flow cell Zn anode, $MnO_2$ cathode) in a non-flow secondary $Zn$—$MnO_2$ battery may be chosen based on the size and properties of the electrodes, such that anode and the cathode capacities may be at least approximately balanced.

In an embodiment, the non-flow secondary $Zn$—$MnO_2$ battery may be assembled by alternating a desired number of non-flow cell sealed Zn anodes and a desired number of sealed $MnO_2$ cathode and holding the electrodes along with the non-flow cell electrolyte solution under compression in the non-flow battery housing.

In an embodiment, a method of producing energy may comprise the steps of: (i) providing a non-flow secondary $Zn$—$MnO_2$ battery assembled as disclosed herein, wherein the non-flow secondary $Zn$—$MnO_2$ battery may be charged when assembled; (ii) discharging the non-flow secondary $Zn$—$MnO_2$ battery to a discharge voltage to produce energy, wherein at least a portion of the Zn of the non-flow cell Zn anode is oxidized; (iii) charging the flow-assisted secondary $Zn$—$MnO_2$ battery to a charge voltage, wherein at least a portion of the ZnO from the non-flow cell Zn anode mixture is reduced to Zn; and (iv) repeating the discharging and the charging of the flow-assisted secondary $Zn$—$MnO_2$ battery.

Generally, the capacity of a given battery can be measured and expressed in terms of energy density, such as for example volumetric energy density, which represents the ratio of energy available from a cell or battery to its volume. The volumetric energy density is usually expressed in watt-hours (energy) per liter (volume), written as Wh/L. Some factors that may affect the energy density (e.g., volumetric energy density) of a given cell or battery may include the theoretical energy of the cell or battery which is dependent on the type, size and shape of the electrodes used, as well as on the type and concentration of the electrolyte solution; the amount of inert material (as opposed to electrochemically active material) including separators, binders, cans, air space, jackets, etc.; and the amount of electrochemically active material available to the cell or battery. In an embodiment, the non-flow secondary $Zn$—$MnO_2$ battery may be characterized by a volumetric energy density of equal to or greater than about 120 Wh/L, alternatively equal to or greater than about 150 Wh/L, or alternatively equal to or greater than about 200 Wh/L.

Generally, the current density of an electrode or a system of electrodes refers to the amount of current that passes through such electrode or electrode system per unit surface area of electrode(s). The current density is usually expressed in $mA/cm^2$. Similarly to the factors that affect energy density, some factors that might affect current density include the type of redox chemistry that occurs at the electrodes; the amount of inert material (as opposed to electrochemically active material) including separators, binders, cans, air space, jackets, etc.; the amount of electrochemically active material available to the cell or battery; and the size and shape of the electrodes used, as this related to the surface area. In an embodiment, the non-flow secondary $Zn$—$MnO_2$ battery may be characterized by a current density of from about 180 $mA/cm^2$ to about 300 $mA/cm^2$, alternatively from about 190 $mA/cm^2$ to about 290 $mA/cm^2$, or alternatively from about 200 $mA/cm^2$ to about 280 $mA/cm^2$.

Generally, the cycle life refers to the number of discharge-charge cycles a cell or battery can experience before it fails to meet specific performance criteria. In an embodiment, the performance criteria may comprise a discharge voltage or current over a specified time, which may or may not be specified for a given number of discharge cycles. In an embodiment, the non-flow secondary $Zn$—$MnO_2$ battery may be characterized by a cycle life of equal to or greater than about 5,000 cycles, alternatively equal to or greater than about 9,000 cycles, or alternatively equal to or greater than about 10,000 cycles.

In an embodiment, the non-flow secondary Zn—MnO$_2$ battery may be used at temperatures ranging from about −10° C. to about 65° C., alternatively from about −5° C. to about 65° C., or alternatively from about 0° C. to about 65° C.

Flow-Assisted Secondary Zn—MnO$_2$ Battery

In an embodiment, the secondary Zn—MnO$_2$ battery comprises a flow-assisted secondary Zn—MnO$_2$ battery. In this configuration, the electrolyte is configured to freely flow between the Zn and MnO$_2$ electrodes. In an embodiment, the flow-assisted secondary Zn—MnO$_2$ battery comprises a flow-assisted battery housing, a flow-assisted cell Zn anode, a MnO$_2$ cathode, and a flow-assisted cell electrolyte solution, where the flow-assisted cell Zn anode, the MnO$_2$ cathode, and the flow-assisted cell electrolyte solution may be located inside the flow-assisted battery housing.

The flow-assisted battery housing is configured to contain the flow assisted anodes, the flow assisted cell electrolyte solution and provide for a flow path for the circulation of the flow assisted cell electrolyte solution. In an embodiment, the flow-assisted battery housing comprises a molded box or container that is generally non-reactive with respect to the flow assisted cell electrolyte solution. In an embodiment, the flow assisted batter housing comprises a polypropylene molded box, an acrylic polymer molded box, or the like.

As will be appreciated by one of skill in the art, and with the help of this disclosure, the MnO$_2$ cathode described as part of the non-flow secondary Zn—MnO$_2$ battery may also be used as the MnO$_2$ cathode for the flow-assisted secondary Zn—MnO$_2$ battery. In an embodiment, the flow-assisted secondary Zn—MnO$_2$ battery comprises a freestanding, self-supported MnO$_2$ cathode. In an embodiment, the flow-assisted secondary Zn—MnO$_2$ battery comprises a MnO$_2$ cathode having a plate configuration, wherein the cathode may have flat surfaces, thereby enabling a layered design of the flow-assisted secondary Zn—MnO$_2$ battery.

In an embodiment, the flow-assisted cell electrolyte solution comprises an ion transporter such as for example an aqueous battery electrolyte or an aqueous electrolyte. In an embodiment, the aqueous battery electrolyte comprises any suitable aqueous electrolyte with good ionic conductivity and with a pH value of about 14, alternatively less than about 14, alternatively less than about 13, or alternatively less than about 12. In the case of rechargeable batteries (e.g., secondary Zn—MnO$_2$ batteries, non-flow secondary Zn—MnO$_2$ batteries, flow-assisted secondary Zn—MnO$_2$ batteries, etc.), the electrolyte is important both for the active/discharging cycle of the battery (while the battery supplies a current) and for the recharging cycle when Zn may be electrodeposited to replenish the anode material (e.g., Zn anode, flow-assisted cell Zn anode).

In an embodiment, the flow-assisted cell electrolyte solution comprises a hydroxide, (e.g., potassium hydroxide, sodium hydroxide, lithium hydroxide, and the like) and zinc oxide (ZnO), wherein the hydroxide can be present in a concentration of from about 1 wt. % to about 50 wt. %, alternatively from about 10 wt. % to about 40 wt. %, or alternatively from about 25 wt. % to about 35 wt. %, based on the total weight of the non-flow cell electrolyte solution; and the ZnO can be present in an amount of from about 0 g/L to about 200 g/L, alternatively from about 30 g/L to about 100 g/L, or alternatively from about 50 g/L to about 80 g/L. In an embodiment, the flow-assisted cell electrolyte solution comprises potassium hydroxide in a concentration of about 30 wt. %, based on the total weight of the non-flow cell electrolyte solution; and ZnO in an amount of about 60 g/L. The amount of ZnO in the flow-assisted cell electrolyte solution may vary depending on the charge-discharge state of the battery since the ZnO is generated by the discharge of the battery and consumed during the electrodeposition of Zn during the recharge cycle of the battery.

In an embodiment, the flow-assisted cell Zn anode comprises electrodeposited Zn and a current collector, wherein the Zn can be electrodeposited onto the current collector during the recharge cycle. While the present disclosure discusses the anodes in the context of flow-assisted cell zinc anodes, it should be understood that other materials, such as for example other metals, aluminum, nickel, magnesium, etc., may be used as flow-assisted cell anodes or anode materials. Without wishing to be limited by theory, Zn as part of the flow-assisted cell Zn anode mixture is an electrochemically active material, and may participate in a redox reaction (according to the reactions depicted in FIG. 1), thereby contributing to the overall voltage of the battery, while the current collector has the purpose of conducting current by enabling electron flow and does not contribute to the overall voltage of the battery. As will be appreciated by one of skill in the art, and with the help of this disclosure, the current collector described as part of the non-flow secondary Zn—MnO$_2$ battery (e.g., part of the non-flow cell Zn anode, part of the MnO$_2$ cathode) may also be used as the current collector for the flow-assisted cell Zn anode.

In an embodiment, the flow-assisted secondary Zn—MnO$_2$ battery may be assembled by using any suitable methodology. In an embodiment, the flow-assisted secondary Zn—MnO$_2$ battery may comprise at least one flow-assisted cell Zn anode and at least one MnO$_2$ cathode. In an embodiment, the non-flow secondary Zn—MnO$_2$ battery may comprise more than one flow-assisted cell Zn anode. As will be appreciated by one of skill in the art, and with the help of this disclosure, the number of electrodes in a flow-assisted secondary Zn—MnO$_2$ battery is dependent upon the desired parameters for such secondary Zn—MnO$_2$ battery. In an embodiment, the number of electrodes (e.g., flow-assisted cell Zn anode, MnO$_2$ cathode) in a flow-assisted secondary Zn—MnO$_2$ battery can be chosen based on the size and properties of the electrodes, such that anode and the cathode capacities are balanced.

Referring to the embodiment of FIG. 3A, a top view of a flow-assisted secondary Zn—MnO$_2$ battery 200 is shown. The electrodes are enclosed in a flow-assisted battery housing 50 which comprises at least two ports 30 for circulating the flow-assisted cell electrolyte solution. In some embodiments, the flow-assisted battery housing 50 may not comprise any ports and an internal fluid circulation device such as a pump may be used to circulate the fluid within the flow-assisted battery housing 50. Two flow-assisted cell Zn anodes are located on inner surfaces of the flow-assisted battery housing 50, wherein the flow-assisted cell Zn anodes face each other (e.g., the flow-assisted cell Zn anodes are located on inner surfaces of the flow-assisted battery housing 50 that face each other or are diametrically opposed to each other). The flow-assisted cell Zn anodes comprise a current collector 40 and electrodeposited Zn 20. A MnO$_2$ cathode 10 is located in the middle of the flow-assisted battery housing 50, between the two flow-assisted cell Zn anodes. While described as having the MnO$_2$ cathode 10 between the Zn anodes, other configurations may also be possible.

Figure 3B:
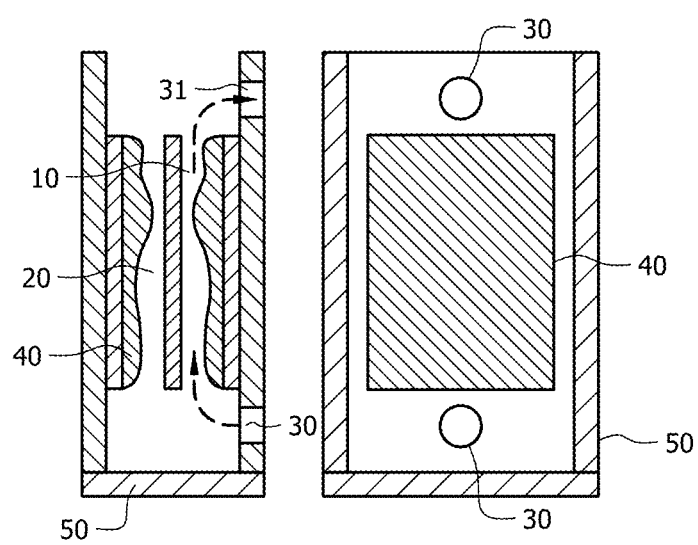
FIG. 3B displays a side view schematic of an embodiment of the flow-assisted secondary Zn—MnO$_2$ battery of FIG. 3A.

Referring to the embodiment of FIG. 3B, a side view schematic of the flow-assisted secondary Zn—MnO$_2$ battery 200 of FIG. 3A is shown. The flow-assisted cell Zn anodes comprising a current collector 40 and electrodeposited Zn 20 are also visible in FIG. 3B, along with the MnO$_2$ cathode 10.

The side view schematic of FIG. 3B also shows both ports 30 which allow for the flow-assisted cell electrolyte solution to be circulated, according to the electrolyte flow arrows 31, wherein a first port (e.g., inlet port) is located in a lower region of the flow-assisted battery housing and a second port (e.g., outlet port) is located in an upper region of the flow-assisted battery housing. This configuration of ports in the flow-assisted battery housing could ensure a vertical flow of flow-assisted cell electrolyte solution between adjacent electrodes (e.g., flow-assisted cell Zn anode, $MnO_2$ cathode). In an alternative embodiment, the first port located in the lower region of the flow-assisted battery housing could be the outlet port and the second port located in the upper region of the flow-assisted battery housing could be the inlet port.

In an embodiment, a means for circulating the flow-assisted cell electrolyte solution comprises a pump, which pumps the flow-assisted cell electrolyte solution through the flow-assisted battery housing (e.g., through the ports in the flow-assisted battery housing). As will be appreciated by one of skill in the art, and with the help of this disclosure, alternative methods could be utilized for circulating the e flow-assisted cell electrolyte solution between the positive and negative electrodes (e.g., flow-assisted cell Zn anode, $MnO_2$ cathode). For example, an internal stirrer or mixer could be provided within the flow-assisted battery housing and an external drive shaft could be mechanically coupled to the stirrer or mixer to rotate same in order to circulate the flow-assisted cell electrolyte solution.

In an embodiment, one or more spacers could be used to physically separate the electrodes (e.g., flow-assisted cell Zn anode, $MnO_2$ cathode) in the flow-assisted secondary Zn—$MnO_2$ battery. In an embodiment, the spacers may comprise materials which (i) are chemically stable in the flow-assisted cell electrolyte solution which is caustic (e.g., has a pH value of about 14) and (ii) have high electrical resistance. Nonlimiting examples of materials suitable for use in the spacers include nylon, acrylonitrile-butadiene-styrene copolymers (ABS), PTFE, acrylic polymers, polyolefins, and the like.

In an embodiment, the spacers comprise spacer washers, spacer bars, tie rods, etc. In an embodiment, the spacer washers could be fixed to one or both of the positive and negative electrodes (e.g., flow-assisted cell Zn anode, $MnO_2$ cathode) and the respective electrodes could be formed with through-holes that could be aligned with the through-holes of the washers. In an embodiment, the spacer washers may have a thickness matching the desired spacing between adjacent electrodes (e.g., flow-assisted cell Zn anode, $MnO_2$ cathode), and the spacer washers could be affixed to surfaces of the electrodes (e.g., flow-assisted cell Zn anode, $MnO_2$ cathode) such that each pair of adjacent electrodes would be spaced from each other by the thickness of one spacer washer.

In an embodiment, each electrode (e.g., flow-assisted cell Zn anode, $MnO_2$ cathode) may have a matching pattern of spacer washers and through-holes such that when the electrodes (e.g., flow-assisted cell Zn anode, $MnO_2$ cathode) are stacked within the flow-assisted battery housing, the spacer washers and through-holes of all the electrodes would be aligned. In such embodiment, the tie rods could be inserted through the through-holes to assemble an electrode stack and keep the electrodes (e.g., flow-assisted cell Zn anode, $MnO_2$ cathode) aligned within the flow-assisted battery housing. In an embodiment, the tie rods could also be configured/used to support the electrode stack within the flow-assisted battery housing. For example, an inner surface of the flow-assisted battery housing could be formed with a lip or protrusion, wherein a row of tie rods could be seated on the lip to support the entire electrode stack within the flow-assisted battery housing.

In an alternative embodiment, the spacers could be arranged in a "window frame" configuration, wherein a series of longitudinal spacer bars could be fixed in a vertical, parallel relationship to one or both of the positive and negative electrodes (e.g., flow-assisted cell Zn anode, $MnO_2$ cathode). The spacer bars could be laterally spaced from each other to form vertical parallel flow channels between adjacent electrodes (e.g., flow-assisted cell Zn anode, $MnO_2$ cathode).

In another embodiment, the spacers could be arranged in a serpentine configuration, wherein a continuous serpentine flow channel could be formed between adjacent electrodes (e.g., flow-assisted cell Zn anode, $MnO_2$ cathode). In such embodiment, vertical spacer bars having a length shorter than a length of their adjacent electrode would connect to horizontal spacer bars to block the ends of the flow channels formed by the vertical spacer bars. As a result, a continuous serpentine flow path could be created beginning at one corner of the electrode (e.g., flow-assisted cell Zn anode, $MnO_2$ cathode) and terminating at an opposite corner.

In yet another embodiment, the electrodes (e.g., flow-assisted cell Zn anode, $MnO_2$ cathode) comprise spacers in the form of insulating protuberances, wherein the insulating protuberances could be in insulating spheres, which are press-fit, for example in apertures formed in the electrode (e.g., flow-assisted cell Zn anode, $MnO_2$ cathode). In such embodiment, a design of the spacers could determine a flow pattern and characteristics of the flow-assisted cell electrolyte solution. Nonlimiting examples of flow patterns that could be created by using various spacer designs include serpentine flow, linear flow between the electrodes, series/parallel flow combinations between the electrodes, etc.

In an embodiment, the flow-assisted secondary Zn—$MnO_2$ battery may further comprise a catalytic plate disposed at the bottom of the flow-assisted battery housing, wherein the catalytic plate may collect isolated zinc falling from the flow-assisted cell Zn anode. The catalytic plate may comprise pure nickel metal, nickel coated steel, or steel coated with small amounts of catalysts intended to promote hydrogen evolution. Without wishing to be limited by theory, when the isolated zinc falls and rests on the catalytic plate, a local corrosion cell is created, with the net effect of hydrogen evolution occurring on the plate, and corrosion and dissolution of the isolated zinc. In an embodiment, the catalytic plate may remove at least a portion of the metallic zinc which has become detached by any reason from the flow-assisted cell Zn anode. In an embodiment, the catalytic plate may remove all of the metallic zinc which has become detached by any reason from the flow-assisted cell Zn anode. In an alternative embodiment, the catalytic plate may be electrically connected to the $MnO_2$ cathode, thereby readily dissolving any metallic zinc solids reaching the catalytic plate.

In an embodiment, during a cycle of operation of the flow-assisted secondary Zn—$MnO_2$ battery the ZnO of the flow-assisted cell electrolyte solution can be deposited as metallic Zn on the current collectors of the flow-assisted cell Zn anodes during charging. As the flow-assisted secondary Zn—$MnO_2$ battery discharges in use, the metallic zinc deposited on the current collectors of the flow-assisted cell Zn anodes can be oxidized to form a zinc oxide, which then dissolves back into the flow-assisted cell electrolyte solution.

In an embodiment, the flow-assisted cell electrolyte solution may be continuously circulated through the flow-assisted battery housing as previously described herein, thereby keeping the flow-assisted cell electrolyte solution well stirred and ensuring an even, homogenous mixture and temperature of the flow-assisted cell electrolyte solution. Without wishing to be limited by theory, the concentration of zinc species (e.g., ZnO) in the flow-assisted cell electrolyte solution decreases during charging of the flow-assisted secondary Zn—$MnO_2$ battery, and the continuous circulation of the flow-assisted cell electrolyte solution maintains the concentration of the zinc species uniform throughout the solution, thereby minimizing Zn dendrite formation and ensuring an uniform deposition of Zn onto the flow-assisted cell Zn anode.

In an embodiment, continuous circulation of the flow-assisted cell electrolyte solution through the flow-assisted battery housing may allow complete dissolution of all Zn from the flow-assisted cell Zn anode during discharge. In such embodiment, the flow-assisted secondary Zn—$MnO_2$ battery can be subjected to a reconditioning cycle, wherein all Zn could be dissolved/removed from the flow-assisted cell Zn anode, thereby allowing the flow-assisted cell Zn anode to return to its original condition (e.g., condition prior to utilizing the flow-assisted secondary Zn—$MnO_2$ battery). In an embodiment, the reconditioning cycle can be performed periodically during a life of the flow-assisted secondary Zn—$MnO_2$ battery to improve performance of the battery and lengthen the life of the battery. In an embodiment, the reconditioning cycle can be performed at least every 20 charge/discharge cycles, alternatively at least 25 charge/discharge cycles, or alternatively at least 30 charge/discharge cycles.

In an embodiment, the flow-assisted secondary Zn—$MnO_2$ battery could be operated as a closed-loop system, wherein any gases evolved from the electrodes (oxygen from the $MnO_2$ cathode and hydrogen from the flow-assisted cell Zn anode) may be recombined to form water, thereby ensuring a constant water inventory in the flow-assisted secondary Zn—$MnO_2$ battery over its life. In an embodiment, small pieces of catalyst could be placed within electrolyte-free headspace of the flow-assisted secondary Zn—$MnO_2$ battery, thereby reducing the pressure during closed-loop operation. Without wishing to be limited by theory, the pressure reduction is due to the recombining of hydrogen and oxygen generated during the operation of the flow-assisted secondary Zn—$MnO_2$ battery.

In an embodiment, a method of producing energy may comprise the steps of: (i) providing a flow-assisted secondary Zn—$MnO_2$ battery assembled as disclosed herein; (ii) charging the flow-assisted secondary Zn—$MnO_2$ battery to a charge voltage, wherein ZnO from the flow-assisted cell electrolyte solution is deposited as electrodeposited Zn on the current collector of the flow-assisted cell Zn anode; (iii) discharging the flow-assisted secondary Zn—$MnO_2$ battery to a discharge voltage to produce energy, wherein at least a portion of the electrodeposited Zn of the flow-assisted cell Zn anode is oxidized and transferred back into the flow-assisted cell electrolyte solution; (iv) optionally further discharging the flow-assisted secondary Zn—$MnO_2$ battery to a final voltage below said discharge voltage, wherein the electrodeposited Zn of the flow-assisted cell Zn anode is completely removed from the flow-assisted cell Zn anode; and (v) continuously circulating the flow-assisted cell electrolyte solution through the flow-assisted battery housing during said steps of charging, discharging and further discharging the flow-assisted secondary Zn—$MnO_2$ battery to said final voltage, wherein the electrodeposited Zn is stripped and re-deposited on the current collector of the flow-assisted cell Zn anode.

In an embodiment, the flow-assisted secondary Zn—$MnO_2$ battery may be characterized by a volumetric energy density of equal to or greater than about 60 Wh/L, alternatively equal to or greater than about 50 Wh/L, or alternatively equal to or greater than about 40 Wh/L.

In an embodiment, the flow-assisted secondary Zn—$MnO_2$ battery may be characterized by a current density of from about 0.01 $A/cm^2$ to about 0.1 $A/cm^2$, alternatively from about 0.01 $A/cm^2$ to about 0.03 $A/cm^2$, or alternatively from about 0.01 $A/cm^2$ to about 0.02 $A/cm^2$.

In an embodiment, the flow-assisted secondary Zn—$MnO_2$ battery may be characterized by a cycle life of equal to or greater than about 200 cycles, alternatively equal to or greater than about 250 cycles, or alternatively equal to or greater than about 300 cycles.

In an embodiment, the flow-assisted secondary Zn—$MnO_2$ battery may be used at temperatures ranging from about 5° C. to about 65° C., alternatively from about 10° C. to about 65° C., or alternatively from about 15° C. to about 65° C.

In an embodiment, the secondary Zn—$MnO_2$ batteries (e.g., non-flow secondary Zn—$MnO_2$ battery, flow-assisted secondary Zn—$MnO_2$ battery) and methods of using the same disclosed herein may advantageously display improved stability, performance, and/or other desired attributes or characteristics. Generally, the devices that are used to store electrical energy are required to be safe, environmentally benign, cheap, and reliable, offering many years of maintenance-free performance. The secondary Zn—$MnO_2$ batteries (e.g., non-flow secondary Zn—$MnO_2$ battery, flow-assisted secondary Zn—$MnO_2$ battery) disclosed herein convey a new approach to the design, manufacturing, and application of a well-established electrochemical system (e.g., Zn—$MnO_2$) to a novel secondary or rechargeable battery which can offer high cycle life; cheap construction cost; safe, non-flammable electrolyte solution (e.g., non-flow cell electrolyte solution, flow-assisted cell electrolyte solution); and maintenance-free operation, while providing high-capacity and high power delivery of electrical energy. Without wishing to be limited by theory, the secondary Zn—$MnO_2$ batteries (e.g., non-flow secondary Zn—$MnO_2$ battery, flow-assisted secondary Zn—$MnO_2$ battery) disclosed herein have a great power capability due to the fast kinetics of the electrodes (e.g., non-flow cell Zn anode, flow-assisted cell Zn anode, $MnO_2$ cathode) and low resistance of the electrolyte solution (e.g., non-flow cell electrolyte solution, flow-assisted cell electrolyte solution).

In an embodiment, the secondary Zn—$MnO_2$ batteries (e.g., non-flow secondary Zn—$MnO_2$ battery, flow-assisted secondary Zn—$MnO_2$ battery) disclosed herein may advantageously display the characteristics of being an inexpensive, rechargeable battery with improved cycle life and high volumetric energy density, improved performance at high current densities; and using environmentally friendly materials as the electroactive electrode materials. With these advantages, the secondary Zn—$MnO_2$ batteries (e.g., non-flow secondary Zn—$MnO_2$ battery, flow-assisted secondary Zn—$MnO_2$ battery) have high potential to replace lead-acid and nickel-cadmium batteries in high power applications, such as automotive starter batteries (ASB) and uninterrupted power back-up systems (UPS). For instance, in automobiles when the engine is turned on, high power is required, typically 300 A at 12 V for a fraction of a second, which may be repeated a few times. Also for UPS applications, high power is required when the input power supply fails while handling high frequency transient loads. Currently-used lead-acid batteries are not only made of hazardous materials such as lead and acid electrolyte, but they also have low volumetric energy densities (e.g., 50-60 Wh/L), limited lifetimes when deeply discharged or used repeatedly in high drain (power) situations. However, of the currently available battery technologies, only lead-acid offers both a price point that is commensurate with these types of applications and safe operation (relative to Li-ion or Na—S technology).

In an embodiment, the secondary Zn—$MnO_2$ batteries (e.g., non-flow secondary Zn—$MnO_2$ battery, flow-assisted secondary Zn—$MnO_2$ battery) disclosed herein may advantageously comprise a pasted configuration, wherein at least one electrode comprises a pasted electrode, such as for example a pasted non-flow cell Zn anode, a pasted $MnO_2$ cathode, etc. In such embodiment, the pasted configuration of the secondary Zn—$MnO_2$ batteries (e.g., non-flow secondary Zn—$MnO_2$ battery, flow-assisted secondary Zn—$MnO_2$ battery) may optimize the batteries for high power applications, such as for example vehicle starting and power protection.

In an embodiment, the secondary Zn—$MnO_2$ batteries (e.g., non-flow secondary Zn—$MnO_2$ battery, flow-assisted secondary Zn—$MnO_2$ battery) disclosed herein may advantageously supply high currents at very high current densities. In such embodiment, given the advantageous low cost and high power of the secondary Zn—$MnO_2$ batteries (e.g., non-flow secondary Zn—$MnO_2$ battery, flow-assisted secondary Zn—$MnO_2$ battery) disclosed herein, these secondary Zn—$MnO_2$ batteries could be used as starter batteries for vehicles or in UPS applications as low-cost and environmentally friendly direct replacements to currently used lead-acid batteries. The non-flow secondary Zn—$MnO_2$ batteries disclosed herein can be successfully cycled for more than 10,000 cycles with rapid charging at high power cycling as a vehicle battery.

In an embodiment, the non-flow secondary Zn—$MnO_2$ battery disclosed herein may advantageously be already charged as assembled/manufactured, thereby requiring no additional processing and reducing manufacturing time and space requirements for its production.

In an embodiment, the flow-assisted secondary Zn—$MnO_2$ battery disclosed herein may advantageously comprise freestanding $MnO_2$ cathodes afforded by continuously circulating the flow-assisted cell electrolyte solution, thereby eliminating the need for any additional supporting structures or geometries.

In an embodiment, the cost of material needed in the secondary Zn—$MnO_2$ batteries (e.g., non-flow secondary Zn—$MnO_2$ battery, flow-assisted secondary Zn—$MnO_2$ battery) disclosed herein can advantageously be less than half the cost of materials for a lead-acid battery. The low cost of such rechargeable, high power, long life secondary Zn—$MnO_2$ batteries renders the secondary Zn—$MnO_2$ batteries disclosed herein highly valuable and much desired.

In an embodiment, the secondary Zn—$MnO_2$ batteries (e.g., non-flow secondary Zn—$MnO_2$ battery, flow-assisted secondary Zn—$MnO_2$ battery) disclosed herein may advantageously display good ionic transport and high conductivity, which is required for high power applications to reduce polarization resistance, owing to the optimization of electrode composition and thickness, as well as electrolyte concentration. In an embodiment, small-scale secondary Zn—$MnO_2$ batteries (e.g., non-flow secondary Zn—$MnO_2$ battery, flow-assisted secondary Zn—$MnO_2$ battery) may advantageously display excellent performance in terms of minimum voltage requirement for starter batteries in vehicles, at high C-rates (3-4 C rates). Generally, a C-rate is a measure of the rate at which a cell or battery is discharged relative to its maximum capacity. While describing batteries, discharge current is often expressed as a C-rate in order to normalize against battery capacity, since the battery capacity is often very different between batteries. For example, a 1 C rate means that the discharge current may discharge the entire battery in 1 hour.

In an embodiment, the secondary Zn—$MnO_2$ batteries (e.g., non-flow secondary Zn—$MnO_2$ battery, flow-assisted secondary Zn—$MnO_2$ battery) disclosed herein may advantageously display multiple successful engine starts in a vehicle. The secondary Zn—$MnO_2$ batteries (e.g., non-flow secondary Zn—$MnO_2$ battery, flow-assisted secondary Zn—$MnO_2$ battery) disclosed herein may advantageously exhibit reserve energy twice as high as a comparable lead-acid battery. The secondary Zn—$MnO_2$ batteries (e.g., non-flow secondary Zn—$MnO_2$ battery, flow-assisted secondary Zn—$MnO_2$ battery) disclosed herein may also display excellent performance at low temperatures (e.g., about 0° C.) and maintain voltage well above 7.2 V as required for cold cranking currents as per SAE standards, when used in vehicles. Additional advantages of the secondary Zn—$MnO_2$ batteries (e.g., non-flow secondary Zn—$MnO_2$ battery, flow-assisted secondary Zn—$MnO_2$ battery) and methods of using same may be apparent to one of skill in the art viewing this disclosure.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

The properties of a non-flow secondary Zn—$MnO_2$ battery and/or components thereof were investigated. More specifically, the viscosity behavior of a $MnO_2$ cathode mixture; the effect of the thickness of the $MnO_2$ cathode on discharge capacity were investigated.

Figure 4A:
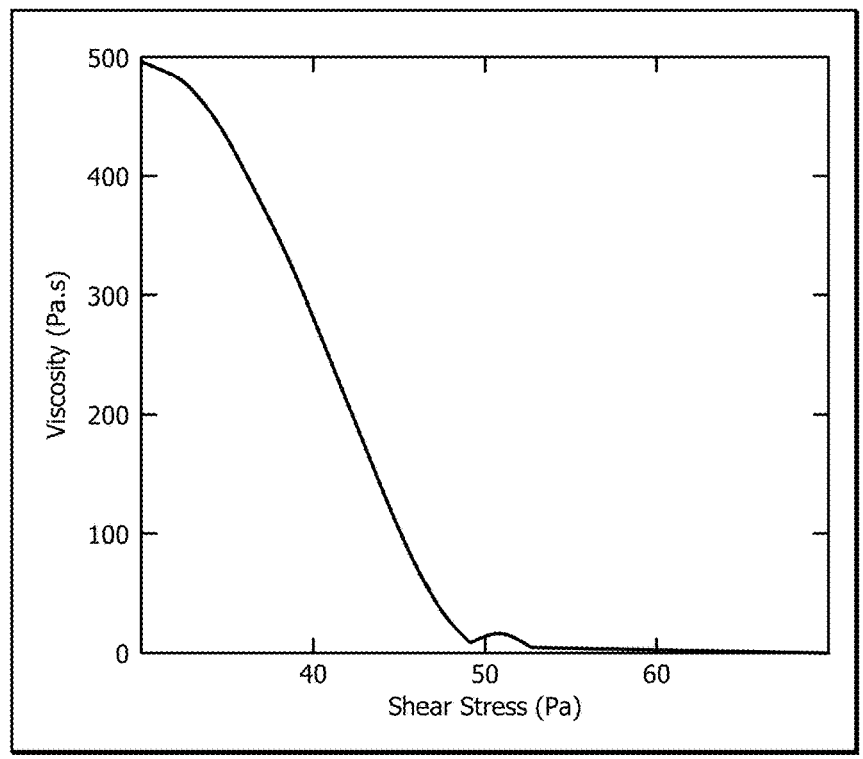
FIG. 4A displays a graph showing the viscosity behavior of an embodiment of a MnO$_2$ cathode mixture.
Figure 4B:
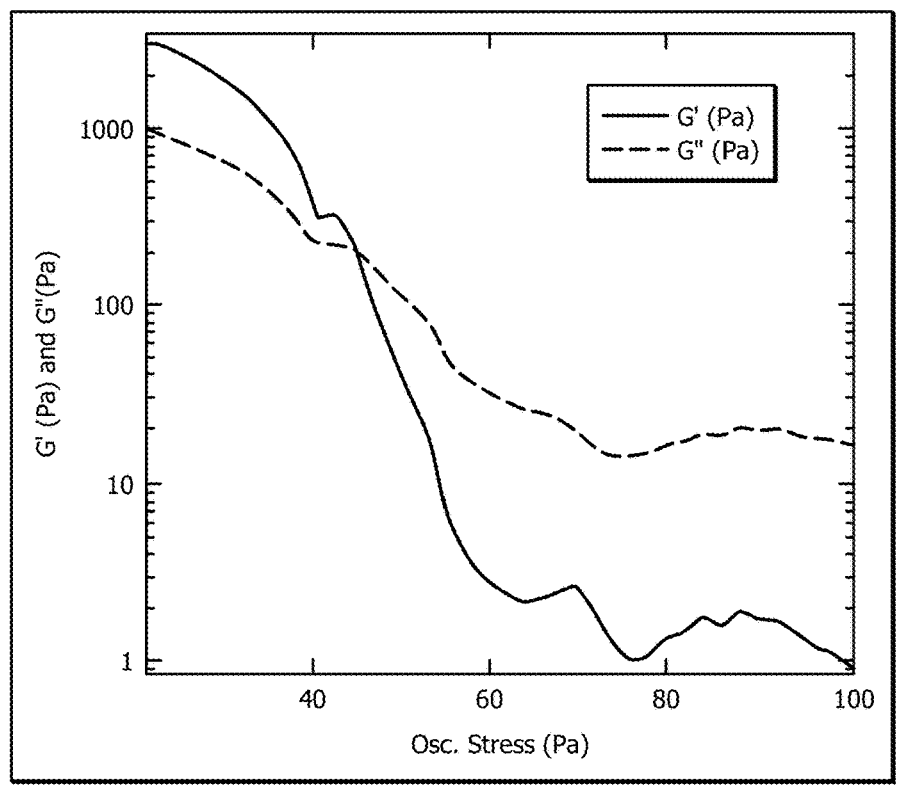
FIG. 4B displays an analysis of elastic versus viscous behavior of the data from FIG. 4A.

A $MnO_2$ cathode mixture was prepared by blending for 2 minutes: 65 wt. % $MnO_2$, 35 wt. % graphite, and 5 wt. % TEFLON emulsion, wherein the TEFLON emulsion contained 60 wt. % TEFLON, followed by filtering the $MnO_2$ cathode mixture. The viscosity behavior of the $MnO_2$ cathode mixture was analyzed by an ARES controlled strain rheometer, and the data is displayed in the graph of FIG. 4A. The $MnO_2$ cathode mixture clearly shows a strong shear thinning behavior. For stresses below about 50 Pa, elastic behavior dominates viscous behavior. For stresses above about 50 Pa, the dominant term is reversed, as shown in FIG. 4B.

Example 2

The $MnO_2$ cathode mixture described in Example 1 was used for preparing $MnO_2$ cathodes of three different thicknesses: 1 mm (0.039 inches), 0.6 mm (0.024 inches), 0.4 mm (0.016 inches). The anode used in all cased was a 0.4 mm (0.016 inches) thick non-flow cell Zn anode comprising 85 wt. % Zn, 10 wt. % ZnO, and 5 wt. % TEFLON emulsion, wherein the TEFLON emulsion contained 60 wt. % TEF- LON. The non-flow cell electrolyte solution was a 30 wt. % potassium hydroxide aqueous solution.

Non-flow secondary Zn—$MnO_2$ batteries were prepared by heat-sealing the non-flow cell Zn anode in one layer of FS 2192 SG membrane as the electrode separator membrane for the anode; wrapping the $MnO_2$ cathode in 3 layers of battery-grade cellophane as the electrode separator membrane for the cathode; sandwiching alternately two $MnO_2$ cathodes and three non-flow cell Zn anodes, followed by holding these electrodes under compression in a polysulfone-molded box. A 30 wt. % potassium hydroxide (KOH) solution was used as the non-flow cell electrolyte solution.

Figure 5:
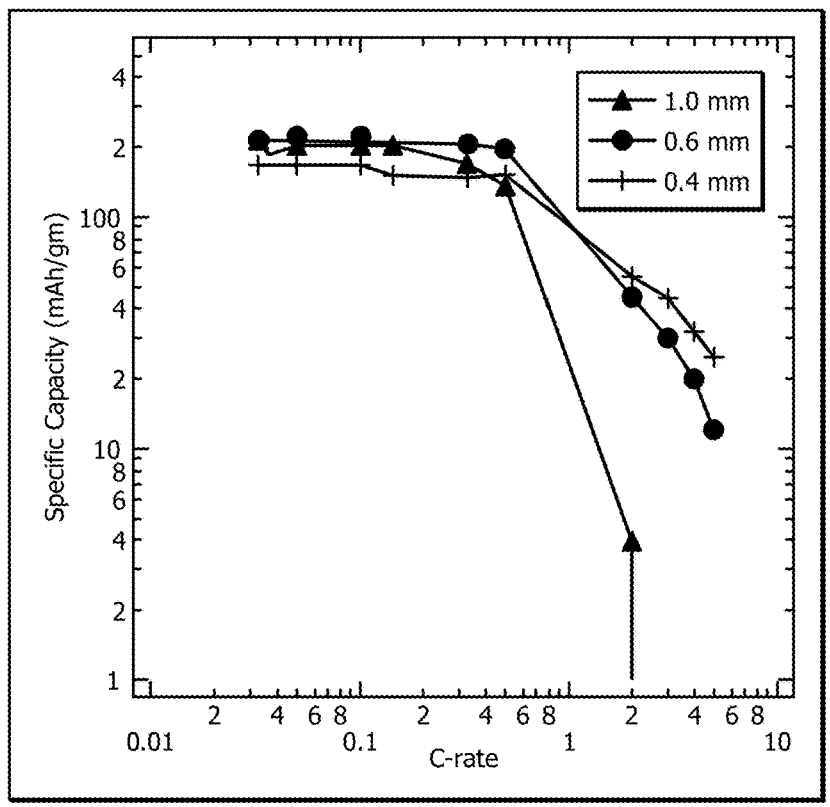
FIG. 5 displays a graph showing the effect of MnO$_2$ cathode thickness on discharge capacity in embodiments of non-flow secondary Zn—MnO$_2$ batteries.

The non-flow secondary Zn—$MnO_2$ batteries were tested at high C-rates (3 C rate), and the data is displayed in the graph of FIG. 5. This C-rate (3 C rate) or current density is as needed for a vehicle starter battery. Three high current pulses were given for 30 seconds each with 5 seconds rests in between pulses. As shown in FIG. 5, with decreasing thickness of the $MnO_2$ cathode, the high rate performance increases. For thinner $MnO_2$ cathodes, the accessible capacity increases. From FIG. 5, it is clear that reduced $MnO_2$ cathode thickness results in better performance of the non-flow secondary Zn—$MnO_2$ battery voltage. This voltage of the non-flow secondary Zn—$MnO_2$ battery is above the minimum voltage requirement for an alternator to operate in a vehicle if strings of such batteries are connected in series.

Example 3

The properties of a non-flow secondary Zn—$MnO_2$ battery and/or components thereof were investigated. More specifically, the effect of the thickness of the electrode separator membrane of the $MnO_2$ cathode on the performance of the non-flow secondary Zn—$MnO_2$ battery was investigated.

Figure 6:
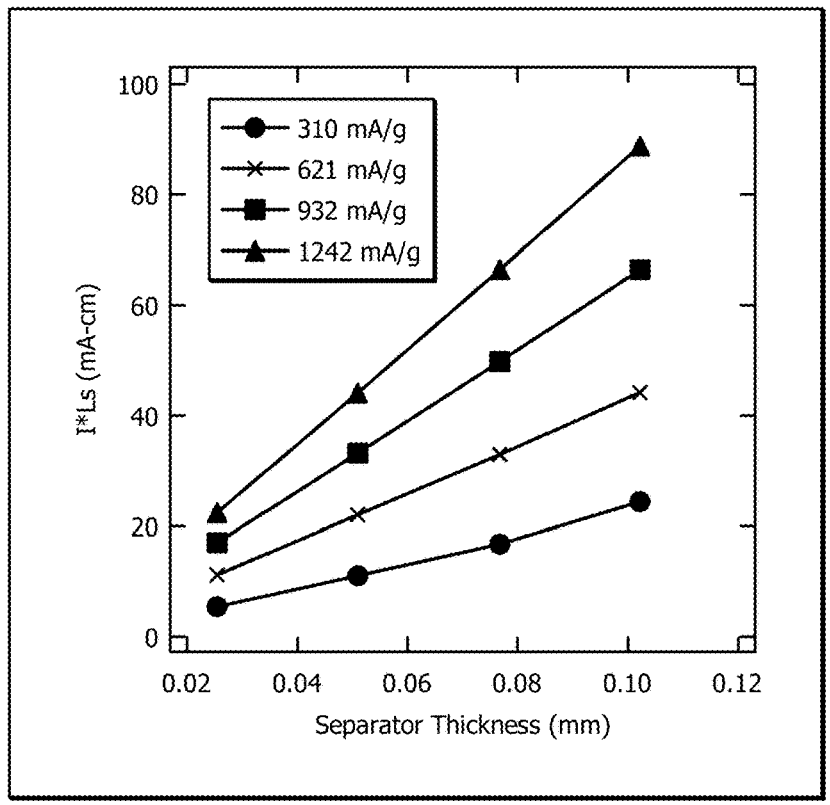
FIG. 6 displays a graph showing the effect of the electrode separator membrane of the MnO$_2$ cathode on non-flow secondary Zn—MnO$_2$ batteries in an exemplary embodiment.

Non-flow secondary Zn—$MnO_2$ batteries were prepared as described in Example 2, with the difference that the number of layers of electrode separator membranes (e.g., battery-grade cellophane) of the $MnO_2$ cathode was varied to obtain desired thicknesses of the electrode separator membranes. The metric used to measure the performance of the non-flow secondary Zn—$MnO_2$ batteries was the product of applied current and thickness of the electrode separator membrane at a given voltage, which represents an indirect measure of the resistance across the electrode separator membrane, and the results are displayed in FIG. 6. As it can be seen from the graph of FIG. 6, as the thickness of the electrode separator membrane of the $MnO_2$ cathode decreases, the ohmic drop across the electrode separator membrane of the $MnO_2$ cathode decreases as well.

Example 4

The properties of a non-flow secondary Zn—$MnO_2$ battery and/or components thereof were investigated. More specifically, the effect of the current collector tab location as well as electrode size in non-flow secondary Zn—$MnO_2$ battery were investigated.

Figure 7:
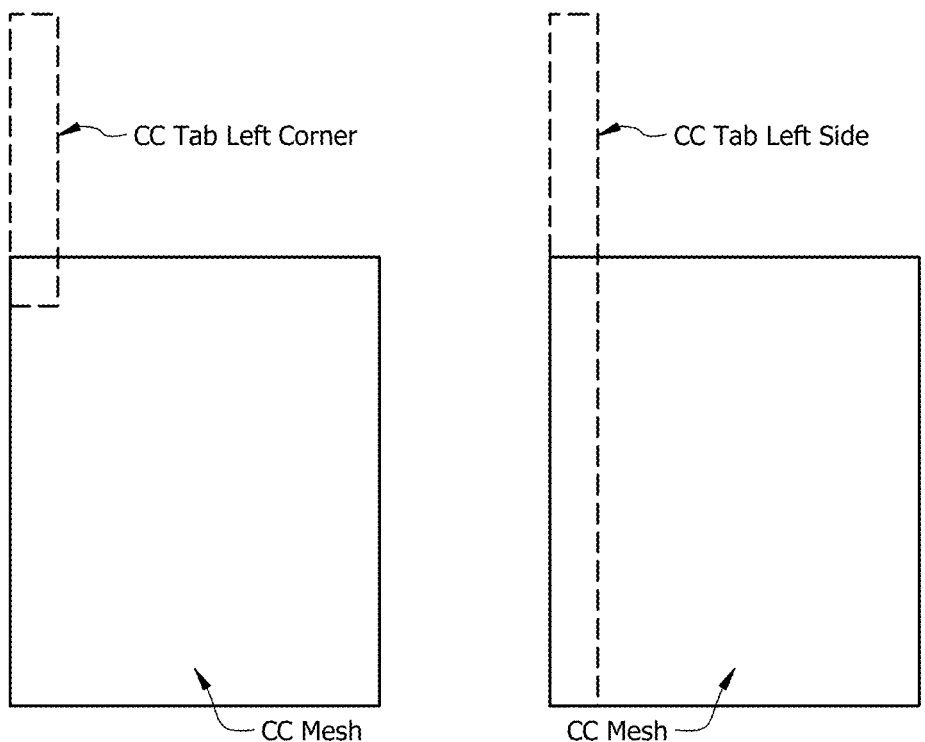
FIG. 7 displays a schematic representation of an embodiment of a current collector tab location on an electrode.

Non-flow secondary Zn—$MnO_2$ batteries were prepared as described in Example 2. The location of the current collector tab (CC tab) was varied according to the schematic in FIG. 7. In one configuration the current collector tab was located in the left corner of the current collector mesh (CC mesh) as part of the electrode. In another configuration, the current collector tab was located on the left side along the entire length of the current collector mesh (CC mesh) as part of the electrode.

Figure 8A:
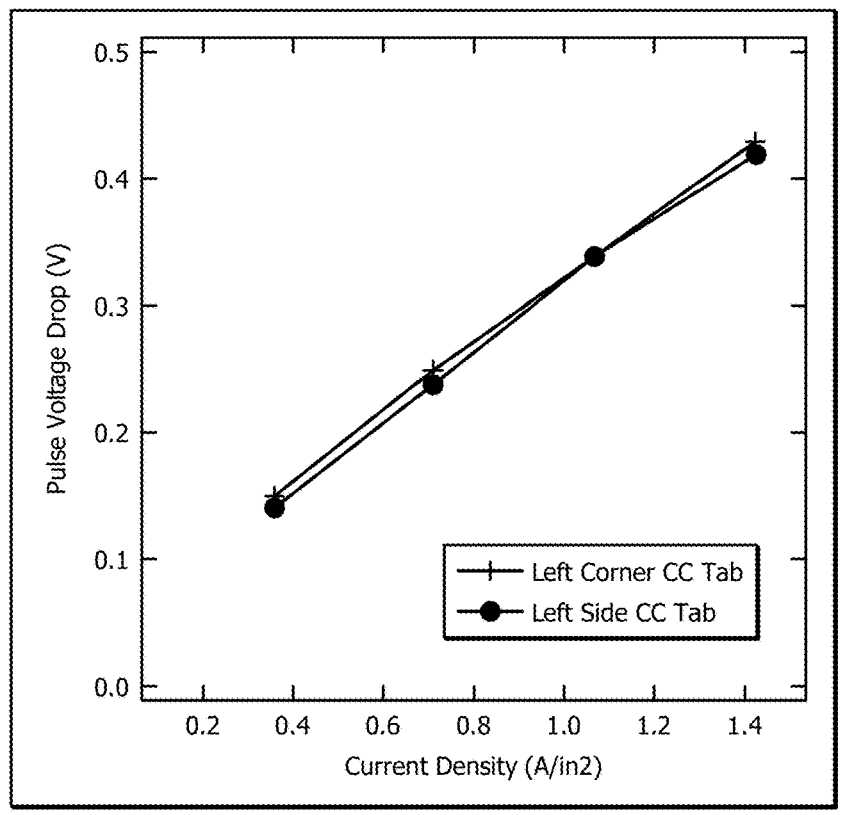
FIG. 8A displays a graph showing the effect of an embodiment of the current collector tab location on non-flow secondary Zn—MnO$_2$ batteries.
Figure 8B:
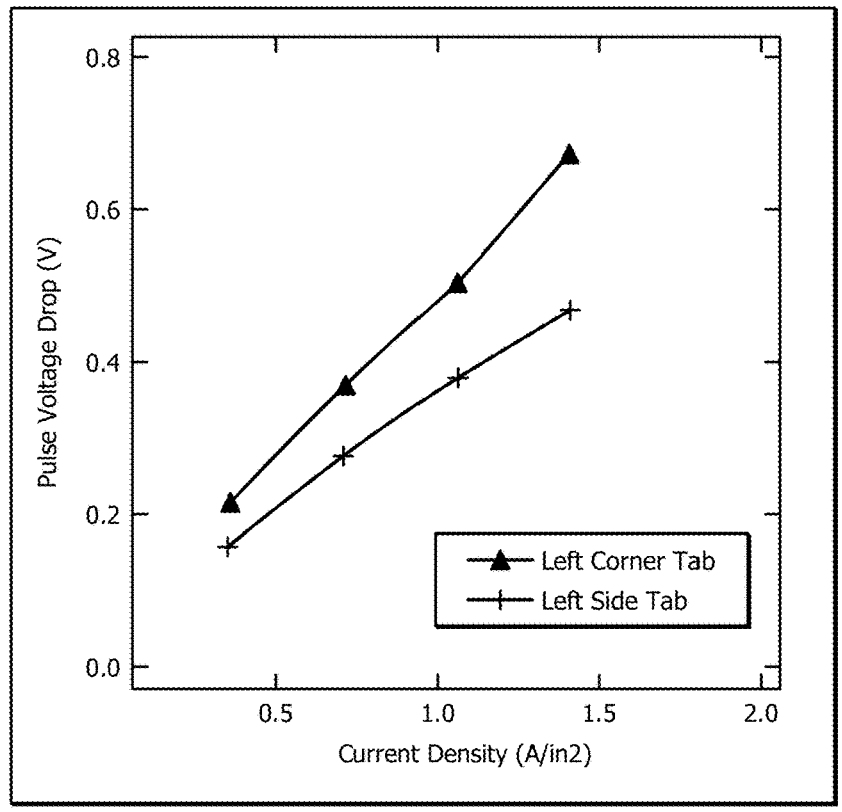
FIG. 8B displays a graph showing the effect of electrode size and current collector tab location on non-flow secondary Zn—MnO$_2$ batteries in an exemplary embodiment.

The ohmic drop was measured in terms of the voltage drop at a given current density. The pulse voltage drop was measured at given current density for 10 seconds, and the data are displayed in FIG. 8. The two electrodes tested for the results displayed in FIG. 8A were the same size: 5 cm×7.6 cm, and the data indicates that for small size electrodes, the location of current collector tab is unimportant as the current distribution is more uniform. However, the effect of electrode size and current collector tab becomes more important at high current discharges. The two electrodes tested for the results displayed in FIG. 8B were the same size (8.9 cm×11.4 cm), but larger than the electrodes tested for the data in FIG. 8A. The data in FIG. 8B indicates that as the size of the electrode increases, the location of the current collector tab plays an important role in the current distribution. For larger electrodes (e.g., 8.9 cm×11.4 cm) if the current collector tab is placed along the entire length of the current collector mesh, the ohmic drop is less, as shown in FIG. 8B.

Example 5

The properties of a non-flow secondary Zn—$MnO_2$ battery and/or components thereof were investigated. More specifically, the effect of the concentration of hydroxide in the non-flow cell electrolyte solution in a non-flow secondary Zn—$MnO_2$ battery was investigated.

Figure 9:
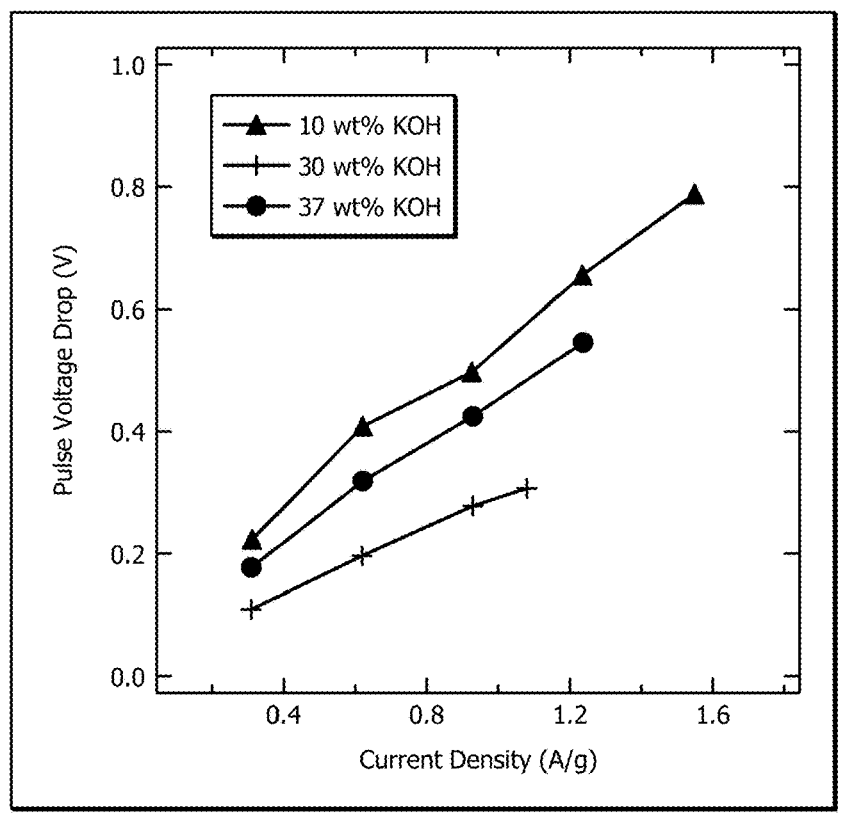
FIG. 9 displays a graph showing the effect of the concentration of hydroxide in the non-flow cell electrolyte solution on non-flow secondary Zn—MnO$_2$ batteries in an exemplary embodiment.

Non-flow secondary Zn—$MnO_2$ batteries were prepared as described in Example 2, with the difference that the concentration of potassium hydroxide was varied: 10 wt. %, 30 wt. %, and 37 wt. %. The effect of electrolyte conductivity was studied by varying the concentration of potassium hydroxide in the non-flow cell electrolyte solution. The pulse voltage drop was measured at a given current density for 10 seconds, and the data are displayed in FIG. 9. FIG. 9 shows the effect of the concentration of potassium hydroxide in the non-flow cell electrolyte solution at high rate discharges. As the conductivity increases, the ohmic drop measured in terms of the pulse voltage drop decreases.

Example 6

The properties of a non-flow secondary Zn—$MnO_2$ battery and/or components thereof were investigated. More specifically, the effect of the binder of a $MnO_2$ cathode in non-flow secondary Zn—$MnO_2$ battery was investigated.

Figure 10:
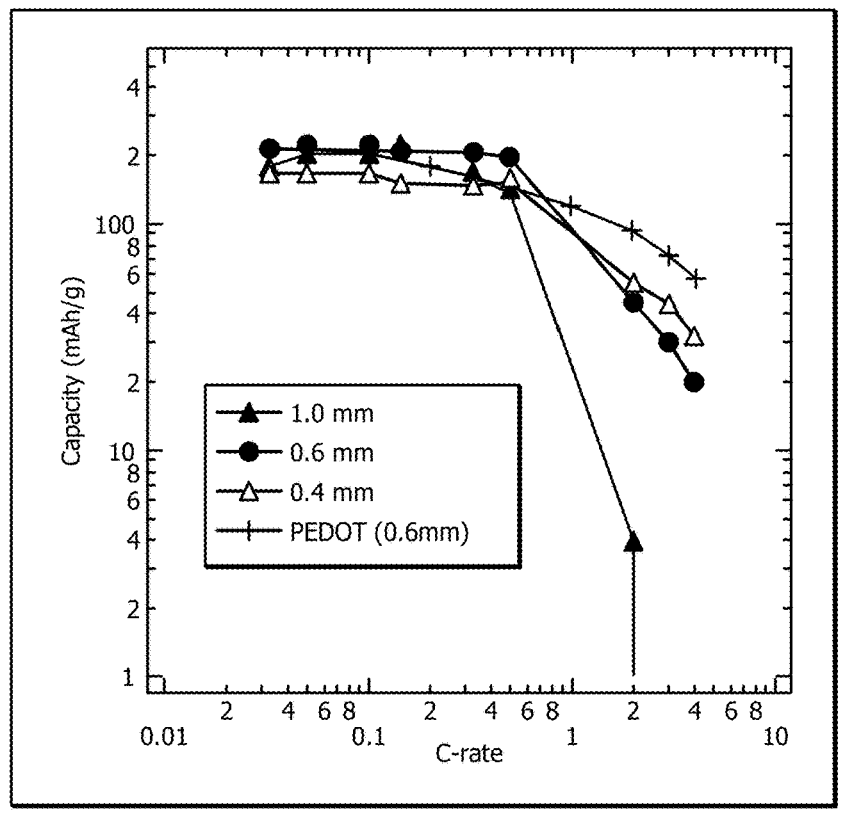
FIG. 10 displays a graph showing the effect of the type of binder used in MnO$_2$ cathode on the performance of non-flow secondary Zn—MnO$_2$ batteries in an exemplary embodiment.

A $MnO_2$ cathode mixture was prepared by blending 67 wt. % $MnO_2$, 28 wt. % graphite, 2 wt. % TEFLON, and 3 wt. % PEDOT:PSS for 2 minutes, followed by filtering the $MnO_2$ cathode mixture and rolling it into a $MnO_2$ cathode mixture sheet. This $MnO_2$ cathode mixture sheet was formed into a $MnO_2$ cathode with a thickness of 0.6 mm (0.024 inches) by pressing the $MnO_2$ cathode mixture sheet onto a Ni mesh current collector at 10,000 psi. This $MnO_2$ cathode was then used to make and test a non-flow secondary Zn—$MnO_2$ battery as described in Example 1. The results were plotted along with the data displayed in FIG. 5 for comparison, and all these results are displayed in FIG. 10. The PEDOT:PSS was added to the $MnO_2$ cathode mixture as a conductive binder. FIG. 10 shows the effect of addition of PEDOT:PSS on the high rate performance/high rate discharge capacity of the non-flow secondary Zn—$MnO_2$ battery. At high rates of discharge, with the addition of conductive binder (PEDOT:PSS) the accessible capacity increases with more $MnO_2$ loading (i.e., increased thickness of the $MnO_2$ cathode).

Example 7

The properties of a non-flow secondary Zn—$MnO_2$ battery and/or components thereof were investigated. More specifically, the cycle life of a non-flow secondary Zn—$MnO_2$ battery was investigated.

Figure 11:
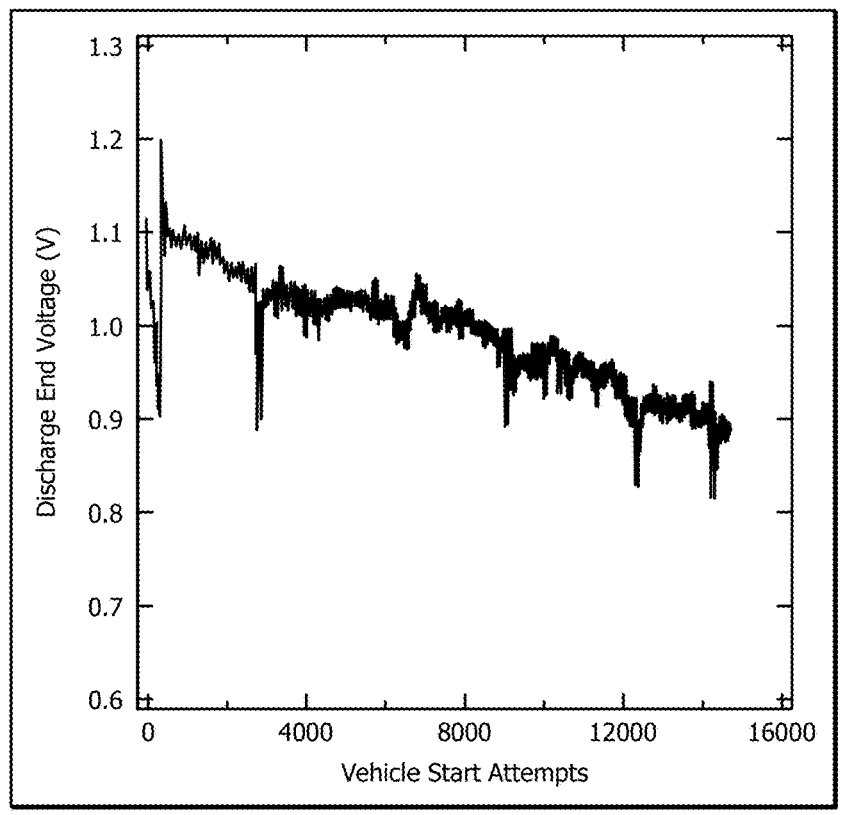
FIG. 11 displays a graph showing the cycle life of a non-flow secondary Zn—MnO$_2$ battery in an exemplary embodiment.

A non-flow secondary Zn—$MnO_2$ battery was prepared as described in Example 2. Three high current pulses have been given and then the non-flow secondary Zn—$MnO_2$ battery was charged. Such charge-discharge cycling was continued to study the cycle life of the non-flow secondary Zn—$MnO_2$ battery under typical vehicle engine starting conditions. FIG. 11 clearly shows the excellent cycling performance over 10,000 start attempts with no significant deterioration of the active material in the electrodes.

Example 8

The properties of a non-flow secondary Zn—$MnO_2$ battery and/or components thereof were investigated. More specifically, the discharge at different C-rates for a non-flow secondary Zn—$MnO_2$ battery was investigated.

Figure 12:
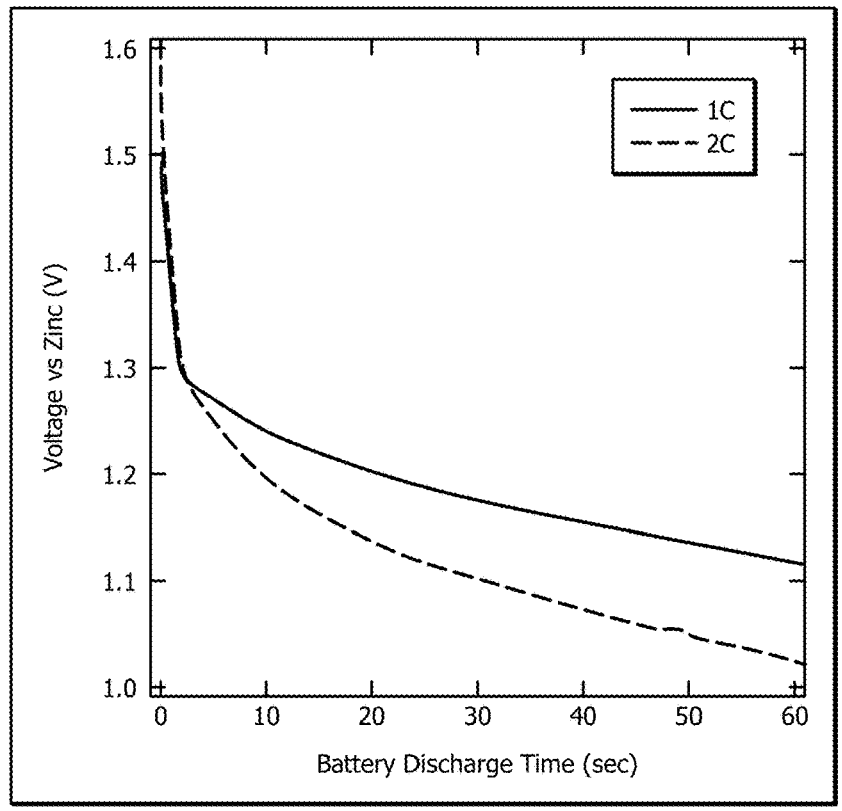
FIG. 12 displays a graph showing the discharge at different C-rates at 0° C. for a non-flow secondary Zn—MnO$_2$ battery in an exemplary embodiment.

A non-flow secondary Zn—$MnO_2$ battery was prepared as described in Example 2, and the tests were conducted at 0° C., to assess the performance of the non-flow secondary Zn—$MnO_2$ battery at low temperatures. As per SAE standards, the low temperature performance of the battery was tested at different C-rates until the battery voltage dropped to 7.2 V after 30 seconds, and the data is shown in FIG. 12. The non-flow secondary Zn—$MnO_2$ battery clearly shows good performance after 30 seconds of discharge maintaining the required voltage (7.2 V).

Example 9

The properties of a $MnO_2$ cathode were investigated. More specifically, the structure of the $MnO_2$ cathode was investigated.

A $MnO_2$ cathode mixture was prepared by blending 65 wt. % $MnO_2$, 30 wt. % graphite, and 5 wt. % TEFLON for 2 minutes, followed by filtering the $MnO_2$ cathode mixture and rolling it into a $MnO_2$ cathode mixture sheet. This $MnO_2$ cathode mixture sheet was formed into a freestanding, self-supported $MnO_2$ cathode by pressing the $MnO_2$ cathode mixture sheet onto a Ni mesh current collector at 10,000 psi.

Figure 13:
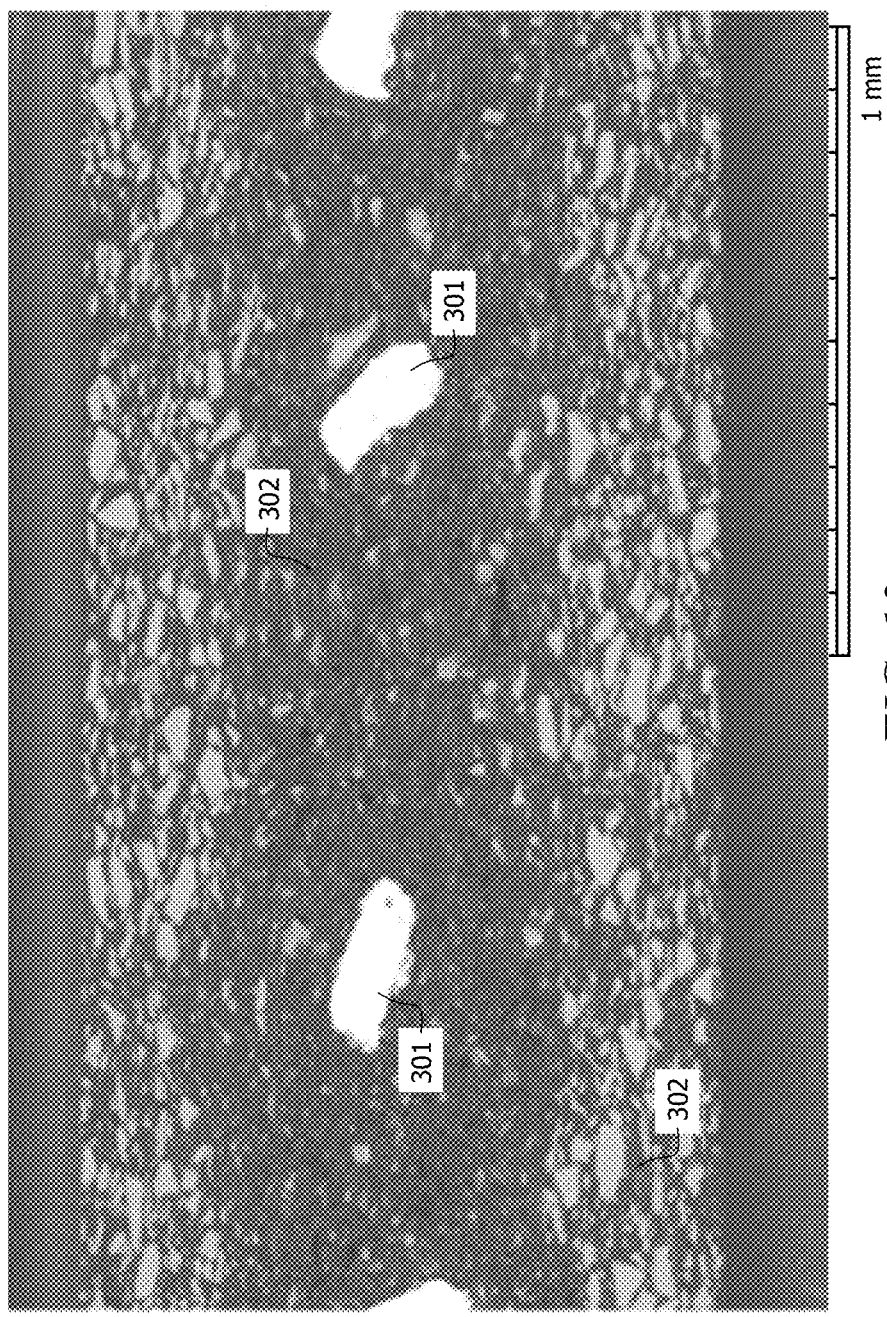
FIG. 13 displays a scanning electron microscope image of cross-section of an embodiment of a freestanding, self-supported MnO$_2$ cathode.

A scanning electron micrograph of a cross-section of the freestanding, self-supported $MnO_2$ cathode is shown in FIG. 13. The scanning electron micrograph shows the position of the current collector 301 within the freestanding, self-supported $MnO_2$ cathode, as well as the $MnO_2$ cathode mixture 302 surrounding a current collector 301.

Example 10

The properties of a flow-assisted secondary Zn—$MnO_2$ battery and/or components thereof were investigated. More specifically, capacity and energy efficiency of a flow-assisted secondary Zn—$MnO_2$ battery were investigated.

A $MnO_2$ cathode mixture was prepared as described in Example 9. A flow-assisted cell Zn anode comprising a Ni-plated Cu current collector was pre-deposited with a layer of Zn. The size of the flow-assisted cell Zn anode was 2 inches×3 inches. The electrodes (cathode assembly and anode pair) were then placed in an acrylic flow-assisted battery housing flow cell, as shown in FIGS. 3A and 3B, with a $MnO_2$ cathode to flow-assisted cell Zn anode separation of 4 mm, to form the flow-assisted secondary Zn—$MnO_2$ battery. The flow-assisted cell electrolyte solution contained 45 wt. % KOH and 60 mg/L ZnO, and the flow-assisted cell electrolyte solution was flowed past the electrodes (e.g., $MnO_2$ cathode, flow-assisted cell Zn anodes).

Figure 14:
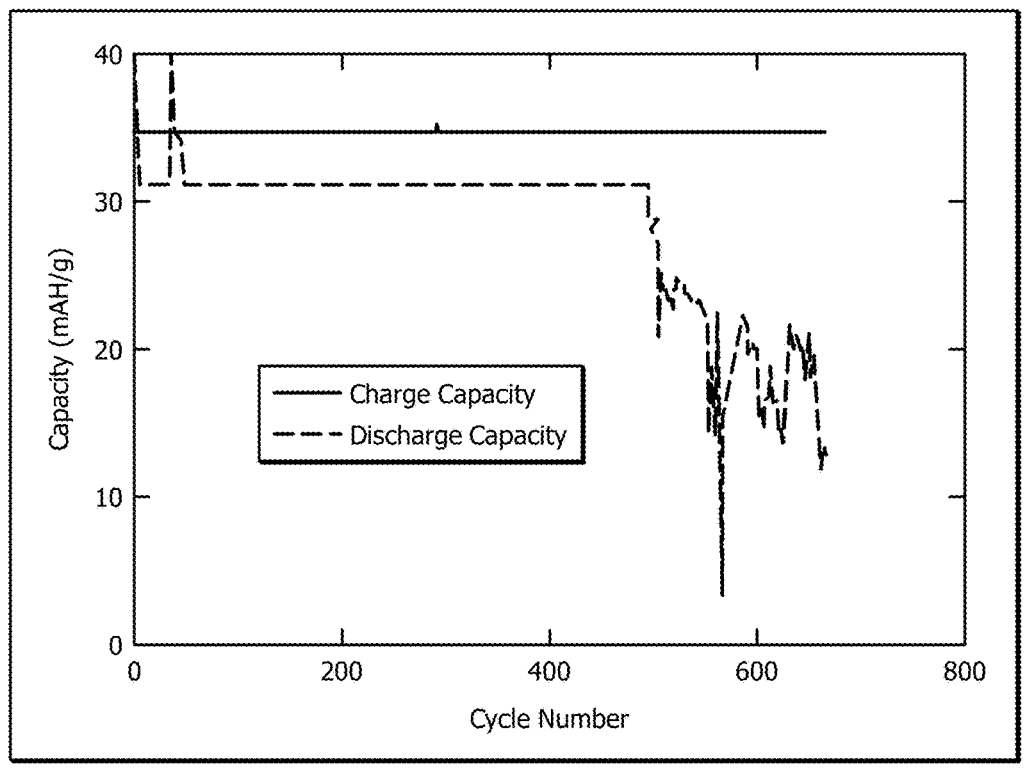
FIG. 14 displays a graph showing capacity as a function of cycle number for a flow-assisted secondary Zn—MnO$_2$ battery in an exemplary embodiment.
Figure 15:
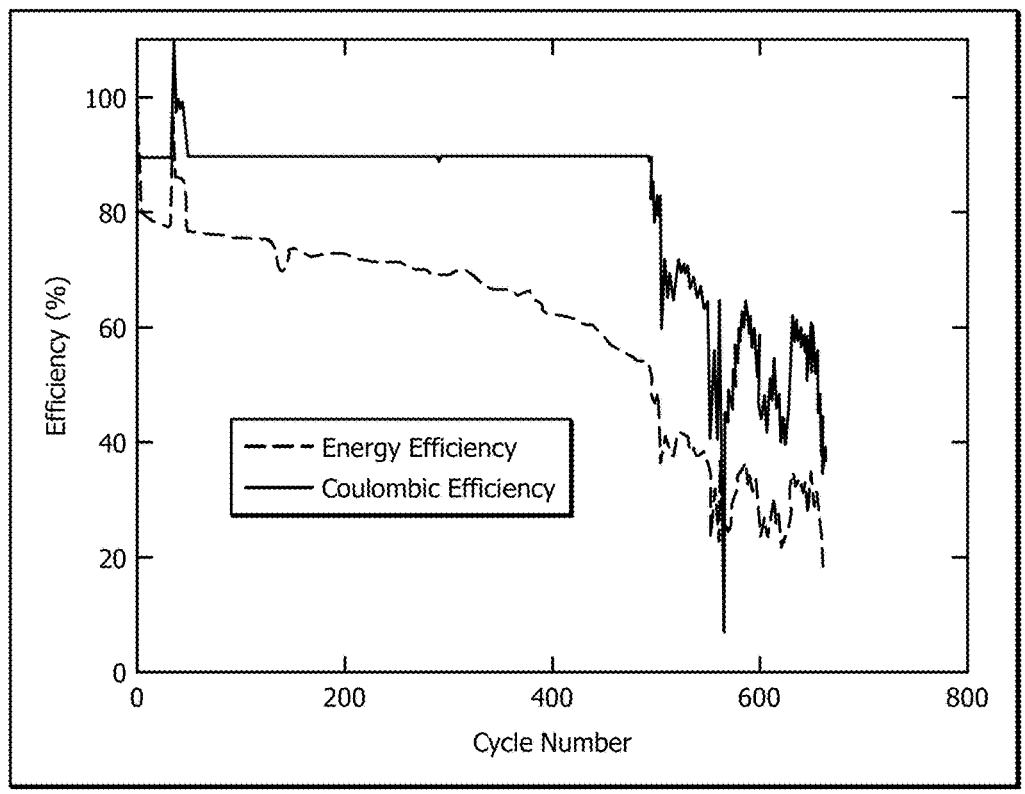
FIG. 15 displays a graph showing coulombic and energy efficiency as a function of cycle number for a flow-assisted secondary Zn—MnO$_2$ battery in an exemplary embodiment.

The performance of the flow-assisted secondary Zn—$MnO_2$ battery was measured and the results are shown in FIGS. 14 and 15. FIG. 14 shows capacity as a function of cycle number, indicating that the cycle life of the flow-assisted secondary Zn—$MnO_2$ battery is at least about 200 cycles. FIG. 15 shows coulombic and energy efficiency as a function of cycle number for the flow-assisted secondary Zn—$MnO_2$ battery, stressing that the cycle life of the flow-assisted secondary Zn—$MnO_2$ battery is at least about 200 cycles.

Additional Disclosure

The following are nonlimiting, specific embodiments in accordance with the present disclosure:

In a first embodiment, a secondary Zn—$MnO_2$ battery comprises a battery housing, a $MnO_2$ cathode, a Zn anode, and an electrolyte solution. The $MnO_2$ cathode, the Zn anode, and the electrolyte solution are disposed within the battery housing, and the $MnO_2$ cathode comprises a $MnO_2$ cathode mixture and a current collector. The $MnO_2$ cathode mixture is in electrical contact with at least a portion of an outer surface of the current collector, and the $MnO_2$ cathode has a porosity of from about 5 vol. % to about 90 vol. %, based on the total volume of the $MnO_2$ cathode mixture of the $MnO_2$ cathode.

A second embodiment may include the secondary Zn—$MnO_2$ battery of the first embodiment, wherein the Zn anode and the $MnO_2$ cathode capacities may be approximately balanced.

A third embodiment may include the secondary Zn—$MnO_2$ battery of the first or second embodiment, wherein at least one of the Zn anode or the $MnO_2$ cathode may comprise a pasted configuration.

A fourth embodiment may include the secondary Zn—$MnO_2$ battery of any of the first to third embodiments, wherein at least one of the $MnO_2$ cathode or the Zn anode may have a thickness of from about 100 microns to about 1,000 microns.

A fifth embodiment may include the secondary Zn—$MnO_2$ battery of any of the first to third embodiments, wherein at least one of the $MnO_2$ cathode or the Zn anode may have a thickness of about 400 microns.

A sixth embodiment may include the secondary Zn—$MnO_2$ battery of any of the first to fifth embodiments, wherein at least one of the $MnO_2$ cathode or the Zn anode may be further wrapped in an electrode separator membrane.

A seventh embodiment may include the secondary Zn—$MnO_2$ battery of the sixth embodiment, wherein the electrode separator membrane comprises a polymeric membrane, a sintered polymer film membrane, a polyolefin membrane, a polyolefin nonwoven membrane, a cellulose membrane, a cellophane, a battery-grade cellophane, a sintered polyolefin film membrane, a hydrophilically modified polyolefin membrane, or any combinations thereof.

An eighth embodiment may include the secondary Zn—$MnO_2$ battery of any of any of the first to seventh embodiments, wherein the $MnO_2$ cathode mixture may comprise MnO$_2$ in an amount of from about 45 wt. % to about 80 wt. %, an electronically conductive material in an amount of from about 10 wt. % to about 45 wt. %, and a binder in an amount of from about 2 wt. % to about 10 wt. %, based on a total weight of the MnO$_2$ cathode mixture.

A ninth embodiment may include the secondary Zn—MnO$_2$ battery of the eighth embodiment, wherein the MnO$_2$ may comprise electrolytic manganese dioxide; wherein the electronically conductive material may comprise carbon, graphite, graphite powder, graphite powder flakes, graphite powder spheroids, carbon black, activated carbon, conductive carbon, amorphous carbon, glassy carbon, or any combination thereof; and wherein the binder may comprise a polymer; a fluoropolymer, polytetrafluoroethylene (PTFE), a copolymer of tetrafluoroethylene and propylene; polyvinylidene fluoride (PVDF), a copolymer of styrene and butadiene, styrene-butadiene rubber (SBR); a conducting polymer, polyaniline, polypyrrole, poly(3,4-ethylenedioxylthiophene) (PEDOT), copolymers of 3,4-ethylenedioxythiophene with various co-monomers (e.g., PEDOT with various dopants), a copolymer of 3,4-ethylenedioxylthiophene and styrenesulfonate (PEDOT:PSS), polyvinyl alcohol (PVA), hydroxymethyl cellulose (HMC), carboxymethyl cellulose (CMC), or any combination thereof.

A tenth embodiment may include the secondary Zn—MnO$_2$ battery of any of any of the first to ninth embodiments, wherein the MnO$_2$ cathode mixture may further comprise a metal, Bi, Sr, Ca, Ba, an oxide thereof, a hydroxides thereof, a nitrate thereof, a chlorides thereof, or any combination thereof.

An eleventh embodiment may include the secondary Zn—MnO$_2$ battery of the first embodiment, wherein the MnO$_2$ cathode may comprise a pasted MnO$_2$ cathode.

A twelfth embodiment may include the secondary Zn—MnO$_2$ battery of any of the first to eleventh embodiments, wherein the MnO$_2$ cathode may comprise a first MnO$_2$ cathode dried sheet, a second MnO$_2$ cathode dried sheet, and the current collector, wherein the first MnO$_2$ cathode dried sheet may be pressed onto a first side of the current collector, wherein the second MnO$_2$ cathode dried sheet may be pressed onto a second side of the current collector, wherein the first and the second MnO$_2$ cathode dried sheets may be pressed onto their respective sides of the current collector at a pressure of from about 3,000 psi to about 10,000 psi, and wherein the MnO$_2$ cathode mixture may be in electrical contact with both the first side and the second side of the current collector.

A thirteenth embodiment may include the secondary Zn—MnO$_2$ battery of any of the first to twelfth embodiments, wherein the current collector may comprise a porous metal collector, a metal conductive mesh, a metal conductive interwoven mesh, a metal conductive expanded mesh, a metal conductive screen, a metal conductive plate, a metal conductive foil, a metal conductive perforated plate, a metal conductive perforated foil, a metal conductive perforated sheet, a sintered porous metal conductive sheet, a sintered metal conductive foam, an expanded conductive metal, a perforated conductive metal, or any combination thereof.

A fourteenth embodiment may include the secondary Zn—MnO$_2$ battery of any of the first to twelfth embodiments, wherein the current collector comprises a metal collector pocketed assembly.

A fifteenth embodiment may include the secondary Zn—MnO$_2$ battery of any of the first to fourteenth embodiments, wherein the current collector may comprise a current collector substrate comprising graphite, carbon, a metal, an alloy, steel, copper, nickel, silver, platinum, brass, or any combination thereof.

A sixteenth embodiment may include the secondary Zn—MnO$_2$ battery of the fifteenth embodiment, wherein the current collector may comprise a metal, nickel, silver, cadmium, tin, lead, bismuth, or any combinations thereof deposited on the current collector substrate.

A seventeenth embodiment may include the secondary Zn—MnO$_2$ battery of any of the first to sixteenth embodiments, wherein the current collector may comprise a current collector tab, and wherein the current collector tab may be in electrical contact with an outer surface of the MnO$_2$ cathode.

An eighteenth embodiment may include the secondary Zn—MnO$_2$ battery of any of the first to seventeenth embodiments, wherein the secondary Zn—MnO$_2$ battery may comprise a non-flow secondary Zn—MnO$_2$ battery, wherein the battery housing may comprise a non-flow battery housing, wherein the Zn anode may comprise a non-flow cell Zn anode, and wherein the electrolyte solution may comprise a non-flow cell electrolyte solution.

A nineteenth embodiment may include the secondary Zn—MnO$_2$ battery of the eighteenth embodiment, wherein the non-flow secondary Zn—MnO$_2$ battery may comprise a prismatic configuration.

A twentieth embodiment may include the secondary Zn—MnO$_2$ battery of the eighteenth or nineteenth embodiments, wherein the non-flow cell Zn anode may comprise a non-flow cell Zn anode mixture and a current collector, wherein the non-flow cell Zn anode mixture may be in electrical contact with at least a portion of an outer surface of the current collector; and wherein the non-flow cell Zn anode may have a porosity of from about 5 vol. % to about 90 vol. % based on the total volume of the non-flow cell Zn anode mixture of the non-flow cell Zn anode.

A twenty first embodiment may include the secondary Zn—MnO$_2$ battery of the twentieth embodiment, wherein the non-flow cell Zn anode mixture may comprise Zn in an amount of from about 50 wt. % to about 90 wt. %, ZnO in an amount of from about 5 wt. % to about 20 wt. %, an electronically conductive material in an amount of from about 5 wt. % to about 20 wt. %, and a binder in an amount of from about 2 wt. % to about 10 wt. %, based on the total weight of the non-flow cell Zn anode mixture.

A twenty second embodiment may include the secondary Zn—MnO$_2$ battery of any of the eighteenth to twenty first embodiments, wherein the non-flow cell Zn anode may comprise a pasted non-flow cell Zn anode.

A twenty third embodiment may include the secondary Zn—MnO$_2$ battery of any of the eighteenth to twenty second embodiments, wherein the non-flow cell electrolyte solution may comprise a hydroxide, a potassium hydroxide, a sodium hydroxide, a lithium hydroxide, or any combination thereof in a concentration of from about 1 wt. % to about 50 wt. % based on the total weight of the non-flow cell electrolyte solution.

A twenty fourth embodiment may include the secondary Zn—MnO$_2$ battery of any of the eighteenth to twenty third embodiments, wherein the non-flow secondary Zn—MnO$_2$ battery may be characterized by a cycle life of equal to or greater than about 5,000 cycles.

A twenty fifth embodiment may include the secondary Zn—MnO$_2$ battery of any of the first to sixteenth embodiments, wherein the secondary Zn—MnO$_2$ battery may comprise a flow-assisted secondary Zn—MnO$_2$ battery, wherein the battery housing may comprise a flow-assisted battery housing, wherein the Zn anode may comprise a flow-assisted cell Zn anode, and wherein the electrolyte solution may comprise a flow-assisted cell electrolyte solution.

A twenty sixth embodiment may include the secondary Zn—$MnO_2$ battery of the twenty fifth embodiment, wherein the flow-assisted secondary Zn—$MnO_2$ battery may comprise a $MnO_2$ cathode plate, and wherein the plate has flat surfaces.

A twenty seventh embodiment may include the secondary Zn—$MnO_2$ battery of the twenty fifth or twenty sixth embodiment, wherein the flow-assisted cell Zn anode may comprise electrodeposited Zn and a current collector, and wherein the electrodeposited Zn may be disposed on and is in electrical contact with the current collector.

A twenty eighth embodiment may include the secondary Zn—$MnO_2$ battery of any of the twenty fifth to twenty seventh embodiments, wherein the flow-assisted cell electrolyte solution may comprise a hydroxide, potassium hydroxide, sodium hydroxide, lithium hydroxide, or combinations thereof in a concentration of from about 1 wt. % to about 50 wt. % based on the total weight of the non-flow cell electrolyte solution, and wherein the flow-assisted cell electrolyte solution may comprise ZnO in an amount of from about 0 g/L to about 200 g/L.

A twenty ninth embodiment may include the secondary Zn—$MnO_2$ battery of any of the twenty fifth to twenty eighth embodiments, wherein flow-assisted secondary Zn—$MnO_2$ battery may be configured to continuously circulate the flow-assisted cell electrolyte solution through the flow-assisted battery housing.

In a thirtieth embodiment, a method for producing energy comprises discharging a non-flow secondary Zn—$MnO_2$ battery to a discharge voltage to produce energy, charging the non-flow secondary Zn—$MnO_2$ battery to a charge voltage, and repeating the discharging and the charging of the flow-assisted secondary Zn—$MnO_2$ battery at least once. The non-flow secondary Zn—$MnO_2$ battery comprises: a non-flow battery housing, a $MnO_2$ cathode, a non-flow cell Zn anode, and a non-flow cell electrolyte solution. The $MnO_2$ cathode, the non-flow cell Zn anode, and the non-flow cell electrolyte solution are supported within the non-flow battery housing, and at least a portion of the Zn of the non-flow cell Zn anode is oxidized during the discharging. At least a portion of the ZnO from the non-flow cell Zn anode mixture is reduced to Zn during the charging, and the non-flow secondary Zn—$MnO_2$ battery is characterized by a cycle life of equal to or greater than about 5,000 cycles.

A thirty first embodiment may include the method of the thirtieth embodiment, wherein the $MnO_2$ cathode may comprise a $MnO_2$ cathode mixture and a current collector, wherein the $MnO_2$ cathode mixture may be in electrical contact with at least a portion of an outer surface of the current collector, and wherein the $MnO_2$ cathode may have a porosity of from about 5 vol. % to about 90 vol. % based on the total volume of the $MnO_2$ cathode mixture of the $MnO_2$ cathode.

A thirty second embodiment may include the method of the thirtieth or thirty first embodiment, wherein the non-flow cell Zn anode may comprise a non-flow cell Zn anode mixture and a current collector, wherein the non-flow cell Zn anode mixture may be in electrical contact with at least a portion of an outer surface of the current collector; and wherein the non-flow cell Zn anode may have a porosity of from about 5 vol. % to about 90 vol. % based on the total volume of the non-flow cell Zn anode mixture of the non-flow cell Zn anode.

A thirty third embodiment may include the method of any of the thirtieth to thirty second embodiments, wherein the non-flow cell Zn anode mixture may comprise Zn in an amount of from about 50 wt. % to about 90 wt. %, ZnO in an amount of from about 5 wt. % to about 20 wt. %, an electronically conductive material in an amount of from about 5 wt. % to about 20 wt. %, and a binder in an amount of from about 2 wt. % to about 10 wt. %, based on the total weight of the non-flow cell Zn anode mixture.

A thirty fourth embodiment may include the method of any of the thirtieth to thirty third embodiments, wherein the non-flow cell electrolyte solution may comprise a hydroxide, a potassium hydroxide, a sodium hydroxide, a lithium hydroxide, or any combination thereof in a concentration of from about 1 wt. % to about 50 wt. % based on the total weight of the non-flow cell electrolyte solution.

A thirty fifth embodiment may include the method of any of the thirtieth to thirty fourth embodiments, wherein the non-flow secondary Zn—$MnO_2$ battery may be charged when assembled.

In a thirty sixth embodiment, a method for producing energy comprises charging the flow-assisted secondary Zn—MnO2 battery to a charge voltage, discharging the flow-assisted secondary Zn—MnO2 battery to a discharge voltage to produce energy, and continuously circulating the flow-assisted cell electrolyte solution through the flow-assisted battery housing during the charging and the discharging. The flow-assisted secondary Zn—MnO2 battery comprises: a flow-assisted battery housing, a MnO2 cathode, a flow-assisted cell Zn anode comprising a current collector, and a flow-assisted cell electrolyte solution. The MnO2 cathode, the flow-assisted cell Zn anode, and the flow-assisted cell electrolyte solution are supported within the flow-assisted battery housing, and ZnO from the flow-assisted cell electrolyte solution is deposited as electrodeposited Zn on the current collector of the flow-assisted cell Zn anode during the charging. At least a portion of the electrodeposited Zn of the flow-assisted cell Zn anode is oxidized and transferred back into the flow-assisted cell electrolyte solution during the discharging.

A thirty seventh embodiment may include the method of the thirty sixth embodiment, further comprising: discharging the flow-assisted secondary Zn—MnO2 battery to a final voltage below the discharge voltage, wherein the electrodeposited Zn of the flow-assisted cell Zn anode is completely removed from the current collector, and wherein continuously circulating the flow-assisted cell electrolyte solution through the flow-assisted battery housing occurs during the discharging of the flow-assisted secondary Zn—MnO2 battery to a final voltage below the discharge voltage.

A thirty eighth embodiment may include the method of the thirty sixth or thirty seventh embodiment, wherein the MnO2 cathode may comprise a MnO2 cathode mixture and a second current collector; wherein the MnO2 cathode mixture may be in electrical contact with at least a portion of an outer surface of the second current collector; wherein the MnO2 cathode may have a porosity of from about 5 vol. % to about 90 vol. % based on the total volume of the MnO2 cathode mixture of the MnO2 cathode.

A thirty ninth embodiment may include the method of any of the thirty sixth to thirty eighth embodiments, wherein the flow-assisted cell electrolyte solution may comprise a hydroxide, a potassium hydroxide, a sodium hydroxide, a lithium hydroxide, or any combination thereof in a concentration of from about 1 wt. % to about 50 wt. % based on the total weight of the non-flow cell electrolyte solution.

A fortieth embodiment may include the method of any of the thirty sixth to thirty ninth embodiments, wherein the flow-assisted cell electrolyte solution may comprise ZnO in an amount of from about 0 g/L to about 200 g/L.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Detailed Description of the Embodiments is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A non-flow secondary Zn—$MnO_2$ battery comprising:
a battery housing;
a $MnO_2$ cathode, wherein a $MnO_2$ cathode mixture comprises $MnO_2$ in an amount of from 45 wt. % to 80 wt. %;
a Zn anode;
an electrode separator membrane disposed between the $MnO_2$ cathode and the Zn anode; and
an electrolyte solution,
wherein the $MnO_2$ cathode, the Zn anode, and the electrolyte solution are disposed within the battery housing,
wherein the $MnO_2$ cathode comprises a $MnO_2$ cathode mixture and a current collector,
wherein the $MnO_2$ cathode mixture is in electrical contact with at least a portion of an outer surface of the current collector,
wherein the $MnO_2$ cathode has a porosity of from 5 vol. % to 90 vol. %, based on the total volume of the $MnO_2$ cathode mixture of the $MnO_2$ cathode, and
wherein an amount of inert material in the $MnO_2$ cathode and the Zn anode, a thickness of the electrode separator membrane, a binder in the $MnO_2$ cathode or the Zn anode, a placement of a current collector tab on the current collector for the $MnO_2$ cathode, and a size and shape of the $MnO_2$ cathode and the Zn anode are configured to provide a current density during the discharging of greater than 180 mA/$cm^2$, wherein the current density of the non-flow secondary Zn—$MnO_2$ battery is an amount of current that passes through the non-flow secondary Zn—$MnO_2$ battery per a total unit surface area of the $MnO_2$ cathode and a non-flow cell Zn anode.

2. The non-flow secondary Zn—$MnO_2$ battery of claim 1, wherein the Zn anode and the $MnO_2$ cathode capacities are balanced.

3. The non-flow secondary Zn—$MnO_2$ battery of claim 1, wherein at least one of the Zn anode or the $MnO_2$ cathode comprises a pasted configuration.

4. The non-flow secondary Zn—$MnO_2$ battery of claim 1, wherein at least one of the $MnO_2$ cathode or the Zn anode have a thickness of from 100 microns to 1,000 microns.

5. The non-flow secondary Zn—$MnO_2$ battery of claim 1, wherein at least one of the $MnO_2$ cathode or the Zn anode are further wrapped in the electrode separator membrane.

6. The non-flow secondary Zn—$MnO_2$ battery of claim 5, wherein the electrode separator membrane comprises a polymeric membrane, a sintered polymer film membrane, a polyolefin membrane, a polyolefin nonwoven membrane, a cellulose membrane, a cellophane, a battery-grade cellophane, a sintered polyolefin film membrane, a hydrophilically modified polyolefin membrane, or any combinations thereof.

7. The non-flow secondary Zn—$MnO_2$ battery of claim 1, wherein the $MnO_2$ cathode mixture comprises an electronically conductive material in an amount of from 10 wt. % to 45 wt. %, and a binder in an amount of from 2 wt. % to 10 wt. %, based on a total weight of the $MnO_2$ cathode mixture.

8. The non-flow secondary Zn—$MnO_2$ battery of claim 7, wherein the $MnO_2$ comprises electrolytic manganese dioxide; wherein the electronically conductive material comprises carbon, graphite, graphite powder, graphite powder flakes, graphite powder spheroids, carbon black, activated carbon, conductive carbon, amorphous carbon, glassy carbon, or any combination thereof; and wherein the binder comprises a polymer; a fluoropolymer, polytetrafluoroethylene (PTFE), a copolymer of tetrafluoroethylene and propylene; polyvinylidene fluoride (PVDF), a copolymer of styrene and butadiene, styrene-butadiene rubber (SBR); a conducting polymer, polyaniline, polypyrrole, poly(3,4-ethylenedioxylthiophene) (PEDOT), copolymers of 3,4-ethylenedioxylthiophene with various co-monomers (e.g., PEDOT with various dopants), a copolymer of 3,4-ethylenedioxylthiophene and styrenesulfonate (PEDOT:PSS), polyvinyl alcohol (PVA), hydroxymethyl cellulose (HMC), carboxymethyl cellulose (CMC), or any combination thereof.

9. The non-flow secondary Zn—$MnO_2$ battery of claim 1, wherein the $MnO_2$ cathode mixture further comprises a metal, Bi, Sr, Ca, Ba, an oxide thereof, a hydroxide thereof, a nitrate thereof, a chloride thereof, or any combination thereof.

10. The non-flow secondary Zn—MnO$_2$ battery of claim 1, wherein the MnO$_2$ cathode comprises a pasted MnO$_2$ cathode.

11. The non-flow secondary Zn—MnO$_2$ battery of claim 1, wherein the MnO$_2$ cathode comprises a first MnO$_2$ cathode dried sheet, a second MnO$_2$ cathode dried sheet, and the current collector, wherein the first MnO$_2$ cathode dried sheet is pressed onto a first side of the current collector, wherein the second MnO$_2$ cathode dried sheet is pressed onto a second side of the current collector, wherein the first and the second MnO$_2$ cathode dried sheets are pressed onto their respective sides of the current collector at a pressure of from 3,000 psi to 10,000 psi, and wherein the MnO$_2$ cathode mixture is in electrical contact with both the first side and the second side of the current collector.

12. The non-flow secondary Zn—MnO$_2$ battery of claim 1, wherein the current collector comprises a porous metal collector, a metal conductive mesh, a metal conductive interwoven mesh, a metal conductive expanded mesh, a metal conductive screen, a metal conductive plate, a metal conductive foil, a metal conductive perforated plate, a metal conductive perforated foil, a metal conductive perforated sheet, a sintered porous metal conductive sheet, a sintered metal conductive foam, an expanded conductive metal, a perforated conductive metal, or any combination thereof.

13. The non-flow secondary Zn—MnO$_2$ battery of claim 1, wherein the current collector comprises a metal collector pocketed assembly.

14. The non-flow secondary Zn—MnO$_2$ battery of claim 1, wherein the current collector comprises a current collector substrate comprising graphite, carbon, a metal, an alloy, steel, copper, nickel, silver, platinum, brass, or any combination thereof.

15. The non-flow secondary Zn—MnO$_2$ battery of claim 14, wherein the current collector comprises a metal, nickel, silver, cadmium, tin, lead, bismuth, or any combinations thereof deposited on the current collector substrate.

16. The non-flow secondary Zn—MnO$_2$ battery of claim 1, wherein the current collector comprises a current collector tab, wherein the current collector tab is in electrical contact with an outer surface of the MnO$_2$ cathode.

17. The non-flow secondary Zn—MnO$_2$ battery of claim 1, wherein the battery housing comprises a non-flow battery housing, wherein the Zn anode comprises a non-flow cell Zn anode, and wherein the electrolyte solution comprises a non-flow cell electrolyte solution.

18. The non-flow secondary Zn—MnO$_2$ battery of claim 17, wherein the non-flow cell Zn anode comprises a non-flow cell Zn anode mixture and an anode current collector, wherein the non-flow cell Zn anode mixture is in electrical contact with at least a portion of an outer surface of the current collector; and wherein the non-flow cell Zn anode has a porosity of from 5 vol. % to 90 vol. % based on the total volume of the non-flow cell Zn anode mixture of the non-flow cell Zn anode.

19. The non-flow secondary Zn—MnO$_2$ battery of claim 18, wherein the non-flow cell Zn anode mixture comprises Zn in an amount of from 50 wt. % to 90 wt. %, ZnO in an amount of from 5 wt. % to 20 wt. %, an electronically conductive material in an amount of from 5 wt. % to 20 wt. %, and a binder in an amount of from 2 wt. % to 10 wt. %, based on the total weight of the non-flow cell Zn anode mixture.

20. The non-flow secondary Zn—MnO$_2$ battery of claim 17, wherein the non-flow cell Zn anode comprises a pasted non-flow cell Zn anode.

21. The non-flow secondary Zn—MnO$_2$ battery of claim 17, wherein the non-flow cell electrolyte solution comprises a hydroxide, a potassium hydroxide, a sodium hydroxide, a lithium hydroxide, or any combination thereof in a concentration of from 1 wt. % to 50 wt. % based on the total weight of the non-flow cell electrolyte solution.

22. The non-flow secondary Zn—MnO$_2$ battery of claim 17, wherein the non-flow secondary Zn—MnO$_2$ battery is characterized by a cycle life of equal to or greater than 5,000 cycles.

23. A method for producing energy of the non-flow secondary Zn—MnO$_2$ battery of claim 1, comprising:
discharging the non-flow secondary Zn—MnO$_2$ battery at a current density of greater than 180 mA/cm$^2$ to a discharge voltage to produce energy, wherein the non-flow secondary Zn—MnO$_2$ battery comprises:
a non-flow battery housing,
a MnO$_2$ cathode,
a non-flow cell Zn anode, and
a non-flow cell electrolyte solution, wherein the MnO$_2$ cathode, the non-flow cell Zn anode, and the non-flow cell electrolyte solution are supported within the non-flow battery housing, and wherein at least a portion of the Zn of the non-flow cell Zn anode is oxidized during the discharging;
charging the non-flow secondary Zn—MnO$_2$ battery to a charge voltage, wherein at least a portion of the ZnO from the non-flow cell Zn anode mixture is reduced to Zn during the charging; and
repeating the discharging and the charging of the non-flow secondary Zn—MnO$_2$ battery at least once, wherein the current density of the non-flow secondary Zn—MnO$_2$ battery is an amount of current that passes through the non-flow secondary Zn—MnO$_2$ battery per a total unit surface area of the MnO$_2$ cathode and the non-flow cell Zn anode.

24. The method of claim 23, wherein the MnO$_2$ cathode comprises a MnO$_2$ cathode mixture and a current collector, wherein the MnO$_2$ cathode mixture is in electrical contact with at least a portion of an outer surface of the current collector, and wherein the MnO$_2$ cathode has a porosity of from 5 vol. % to 90 vol. % based on the total volume of the MnO$_2$ cathode mixture of the MnO$_2$ cathode.

25. The method of claim 23, wherein the non-flow cell Zn anode comprises a non-flow cell Zn anode mixture and a current collector, wherein the non-flow cell Zn anode mixture is in electrical contact with at least a portion of an outer surface of the current collector; and wherein the non-flow cell Zn anode has a porosity of from 5 vol. % to 90 vol. % based on the total volume of the non-flow cell Zn anode mixture of the non-flow cell Zn anode.

26. The method of claim 23, wherein the non-flow cell Zn anode mixture comprises Zn in an amount of from 50 wt. % to 90 wt. %, ZnO in an amount of from 5 wt. % to 20 wt. %, an electronically conductive material in an amount of from 5 wt. % to 20 wt. %, and a binder in an amount of from 2 wt. % to 10 wt. %, based on the total weight of the non-flow cell Zn anode mixture.

27. The method of claim 23, wherein the non-flow cell electrolyte solution comprises a hydroxide, a potassium hydroxide, a sodium hydroxide, a lithium hydroxide, or any combination thereof in a concentration of from 1 wt. % to 50 wt. % based on the total weight of the non-flow cell electrolyte solution.

28. The method of claim 23, wherein the non-flow secondary $Zn$—$MnO_2$ battery is charged when assembled.

* * * * *